(12) United States Patent
Strohmann et al.

(10) Patent No.: US 12,284,481 B2
(45) Date of Patent: Apr. 22, 2025

(54) AUDIO SPEAKER AND PROXIMITY SENSOR WITH PIEZOELECTRIC POLYMER TECHNOLOGY

(71) Applicant: QUALCOMM Incorporated, San Diego, CA (US)

(72) Inventors: Jessica Liu Strohmann, Cupertino, CA (US); Hrishikesh Vijaykumar Panchawagh, Cupertino, CA (US); Nicholas Ian Buchan, San Jose, CA (US); Yipeng Lu, Davis, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/302,714

(22) Filed: May 11, 2021

(65) Prior Publication Data

US 2021/0377670 A1     Dec. 2, 2021

Related U.S. Application Data

(60) Provisional application No. 62/704,825, filed on May 29, 2020.

(51) Int. Cl.
*H04R 17/00*     (2006.01)
*B06B 1/06*     (2006.01)
(Continued)

(52) U.S. Cl.
CPC ......... *H04R 17/005* (2013.01); *B06B 1/0692* (2013.01); *H04R 1/028* (2013.01);
(Continued)

(58) Field of Classification Search
CPC .... H04R 17/005; H04R 17/02; H04R 17/025; H04R 1/028; H04R 2499/11;
(Continued)

(56) References Cited

U.S. PATENT DOCUMENTS

| 2015/0146895 A1* | 5/2015 | Gerlach | H04R 17/00 |
| | | | 381/190 |
| 2015/0169136 A1* | 6/2015 | Ganti | G06F 3/0436 |
| | | | 345/177 |

(Continued)

FOREIGN PATENT DOCUMENTS

| CN | 110337056 A | * 10/2019 | ........... H04R 31/003 |
| CN | 111277682 A | * 6/2020 | ............... G09F 9/00 |

(Continued)

OTHER PUBLICATIONS

International Search Report and Written Opinion—PCT/US2021/031918—ISA/EPO—Sep. 2, 2021.

*Primary Examiner* — Ahmad F. Matar
*Assistant Examiner* — Sabrina Diaz
(74) *Attorney, Agent, or Firm* — QUALCOMM Incorporated

(57) ABSTRACT

A mobile device includes one or more piezoelectric polymer layers underlying a display. The one or more piezoelectric polymer layers may be electrically driven to operate in either a d33 stretching mode or a d31 bending mode. The mobile device functions as an ultrasonic sensor in the d33 stretching mode and as an audio speaker/microphone or a proximity sensor in the d31 bending mode. The piezoelectric polymer layer operating in the d31 bending mode may be directly mechanically coupled to a display, indirectly mechanically coupled to the display and underlying an ultrasonic sensor stack, or integrated in the ultrasonic sensor stack. Signal performance of the piezoelectric polymer layer operating in the d31 bending mode may be enhanced or modulated by (Continued)

having a larger area, multiple layers, bi-pole or uni-pole driving with multiple layers, one or more stiff adhesives, a spacer layer, one or more mass features, a thin TFT layer, a thick piezoelectric polymer layer, or combinations thereof.

13 Claims, 18 Drawing Sheets

(51) Int. Cl.
*H04R 1/02* (2006.01)
*H04R 17/02* (2006.01)
*H10N 30/857* (2023.01)
*G06V 40/13* (2022.01)

(52) U.S. Cl.
CPC ........... *H04R 17/02* (2013.01); *H10N 30/857* (2023.02); *G06V 40/1306* (2022.01); *H04R 2499/11* (2013.01); *H04R 2499/15* (2013.01)

(58) Field of Classification Search
CPC .......... H04R 2499/15; H04R 2201/023; H04R 2217/00; H04R 2217/01; H04R 2217/03; H04R 7/04; H04R 7/045; H04R 7/06; B06B 1/0692; H01L 41/193; G06V 40/1306
USPC .................................. 381/33, 306, 388, 190
See application file for complete search history.

(56) References Cited

U.S. PATENT DOCUMENTS

| | | | |
|---|---|---|---|
| 2016/0107194 A1 | 4/2016 | Panchawagh et al. | |
| 2017/0083098 A1* | 3/2017 | Usui | G06F 1/1626 |
| 2018/0373913 A1* | 12/2018 | Panchawagh | H10K 59/00 |
| 2019/0014402 A1* | 1/2019 | Ahn | H05K 7/20963 |
| 2019/0205595 A1* | 7/2019 | Gong | H10K 59/40 |
| 2021/0306741 A1* | 9/2021 | Kim | H04R 1/403 |

FOREIGN PATENT DOCUMENTS

| | | | | |
|---|---|---|---|---|
| KR | 20190013122 A | 2/2019 | | |
| KR | 20190018251 A | 2/2019 | | |
| WO | WO-2018155867 A1 * | 8/2018 | | H04M 1/03 |

* cited by examiner

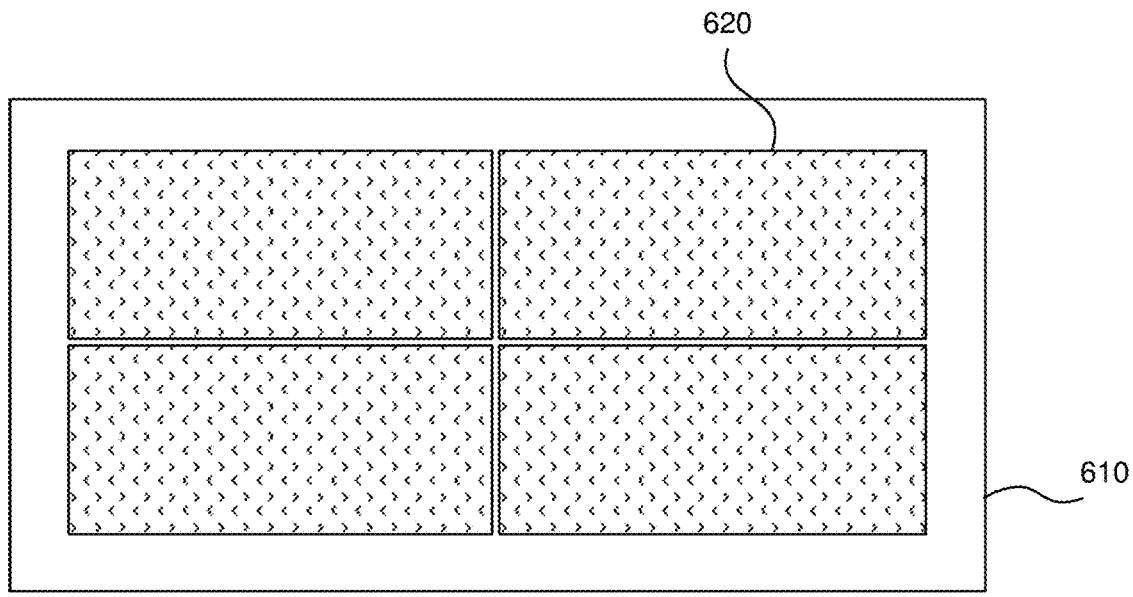
Figure 6
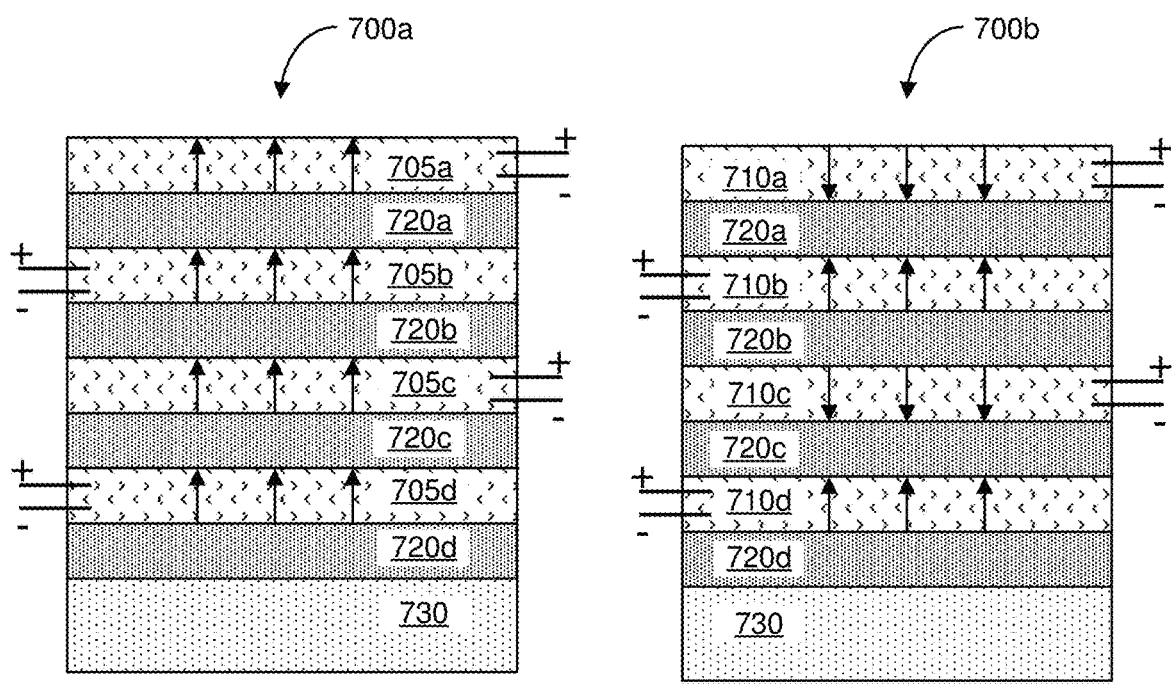
Figure 7A                    Figure 7B

AUDIO SPEAKER AND PROXIMITY SENSOR WITH PIEZOELECTRIC POLYMER TECHNOLOGY

CROSS-REFERENCE TO RELATED APPLICATIONS

This disclosure claims priority to U.S. Provisional Patent Application No. 62/704,825, filed May 29, 2020, entitled "IN-DISPLAY SPEAKER AND GESTURE SENSOR WITH PIEZOELECTRIC POLYMER TECHNOLOGY," assigned to the assignee hereof and incorporated herein by reference in its entirety and for all purposes.

TECHNICAL FIELD

This disclosure relates generally to sensor systems in mobile devices and more particularly to ultrasonic sensor systems in mobile devices using piezoelectric polymer materials that can function as audio speakers and proximity or gesture sensors.

DESCRIPTION OF RELATED TECHNOLOGY

Many mobile devices include sensors such as fingerprint sensors for authenticating a user to the mobile device. For example, in an ultrasonic sensor system, an ultrasonic transmitter may be used to send an ultrasonic wave towards an object to be detected. After passing through a platen on which a person's finger may be placed, some portions of the ultrasonic wave encounter skin that is in contact with the platen, e.g., fingerprint ridges, while other portions of the ultrasonic wave encounter air. A fingerprint image may be obtained based on reflected signals associated with the person's finger.

Advances in mobile devices have resulted in flexible displays, three-dimensional cover glasses, and bezel-less designs. Consequently, more and more mobile devices have limited space to incorporate so many different components. Mobile devices may be assembled with many components including proximity sensors, earpiece speakers, microphones, and sensors for authenticating users. Each of these components constitute additional components that go into the mobile device and require extra assembly steps.

SUMMARY

The devices, systems, and methods of this disclosure each have several aspects, no single of which is solely responsible for the desirable attributes disclosed herein.

One aspect of the subject matter of this disclosure can be implemented in a mobile device. The mobile device includes a platen, a display underlying the platen, a thin-film transistor (TFT) layer underlying the display, a piezoelectric polymer layer adjacent to and coupled to the TFT layer, and an electrode layer adjacent to and coupled to the piezoelectric polymer layer, where the piezoelectric polymer layer is positioned between the electrode layer and the TFT layer. The piezoelectric polymer layer is configured to generate acoustic waves and operate in a d33 stretching mode and a d31 bending mode, wherein the d33 stretching mode operates in a first frequency range between about 1 MHz and about 100 MHz as an ultrasonic sensor and wherein the d31 bending mode operates in either (1) a second frequency range between about 20 kHz and about 1 MHz to function as a proximity sensor or (2) a third frequency range between about 20 Hz and about 20 kHz to function as an audio speaker or microphone.

In some implementations, the mobile device further includes a spacer layer between the piezoelectric polymer layer and the display, where the spacer layer includes a plastic, metal or glass material. In some implementations, the spacer layer is configured to adjust a signal output of acoustic waves generated by the piezoelectric polymer layer in one or more frequency ranges and/or shift a peak frequency of the acoustic waves generated by the piezoelectric polymer layer. In some implementations, a thickness of the spacer layer is at least two times greater than a thickness of the piezoelectric polymer layer. In some implementations, a thickness of the TFT layer is at least two times less than a thickness of the platen. In some implementations, the mobile device further includes a stiff epoxy adhesive layer between the TFT layer and the display. In some implementations, the mobile device further includes one or more mass features attached to the piezoelectric polymer layer, where the one or more mass features include a plastic, metal, or glass material. In some implementations, a major surface of the piezoelectric polymer layer spans more than about 50% of the display. In some implementations, the mobile device further includes one or more additional piezoelectric polymer layers underlying the piezoelectric polymer layer.

Another innovative aspect of the subject matter described in this disclosure can be implemented in a mobile device. The mobile device includes a platen, a display underlying the platen, a TFT layer underlying the display, a first piezoelectric polymer layer adjacent to and coupled to the TFT layer, an electrode layer adjacent to and coupled to the first piezoelectric polymer layer, where the first piezoelectric polymer layer is positioned between the electrode layer and the TFT layer, where the TFT layer, and the first piezoelectric polymer layer form an ultrasonic sensor configured to operate in a d33 stretching mode, and a second piezoelectric polymer layer underlying the display, wherein the second piezoelectric polymer layer is configured to operate in a d31 bending mode.

In some implementations, the d33 stretching mode is configured to operate in a first frequency range between about 1 MHz and about 100 MHz, wherein the d31 bending mode is configured to operate in either (1) a second frequency range between about 20 kHz and about 1 MHz to function as a proximity sensor or (2) a third frequency range between about 20 Hz and about 20 kHz to function as an audio speaker. In some implementations, the first piezoelectric polymer layer is a piezoelectric polymer receiver layer configured to operate in either the d33 stretching mode or the d31 bending mode, where the d31 bending mode is configured to operate in a frequency range between about 20 Hz and about 20 kHz to function as a microphone. In some implementations, the second piezoelectric polymer layer is mechanically coupled to the display in a region of the display separate from a region occupied by the ultrasonic sensor. In some implementations, the second piezoelectric polymer layer is mechanically coupled to and underlying the ultrasonic sensor. In some implementations, the mobile device further includes a spacer layer between the second piezoelectric polymer layer and the display, where the spacer layer includes a plastic, metal or glass material. In some implementations, the second piezoelectric polymer layer is configured to generate acoustic waves and the spacer layer is configured to adjust a signal output of the acoustic waves generated by the second piezoelectric polymer layer in one or more frequency ranges and/or shift a peak frequency of the acoustic waves generated by the second piezoelectric polymer layer. In some implementations, a thickness of the spacer layer is at least two times greater than a thickness of the second piezoelectric polymer layer. In some implementations, a thickness of the TFT layer is at least two times less than a thickness of the platen. In some implementations, the mobile device further includes a stiff epoxy adhesive layer between the TFT layer and the display. In some implementations, a major surface of the second piezoelectric polymer layer spans more than about 50% of the display.

BRIEF DESCRIPTION OF THE DRAWINGS

Details of one or more implementations of the subject matter described in this specification are set forth in the accompanying drawings and the description below. Other features, aspects, and advantages will become apparent from the description, drawings and claims. Note that the relative dimensions of the following figures may not be drawn to scale.

Like reference numbers and designations in the various drawings indicate like elements.

FIG. 6 shows a schematic illustration of a piezoelectric polymer layer spanning a large area of a display according to some implementations.

FIG. 7A shows a schematic illustration of a uni-pole arrangement of multiple piezoelectric polymer layers so that the piezoelectric polymer layers are driven with the same polarities according to some implementations.

FIG. 7B shows a schematic illustration of a bi-pole arrangement of multiple piezoelectric polymer layers so that alternating piezoelectric polymer layers are driven at opposite polarities according to some implementations.

DETAILED DESCRIPTION

Figure 1A:
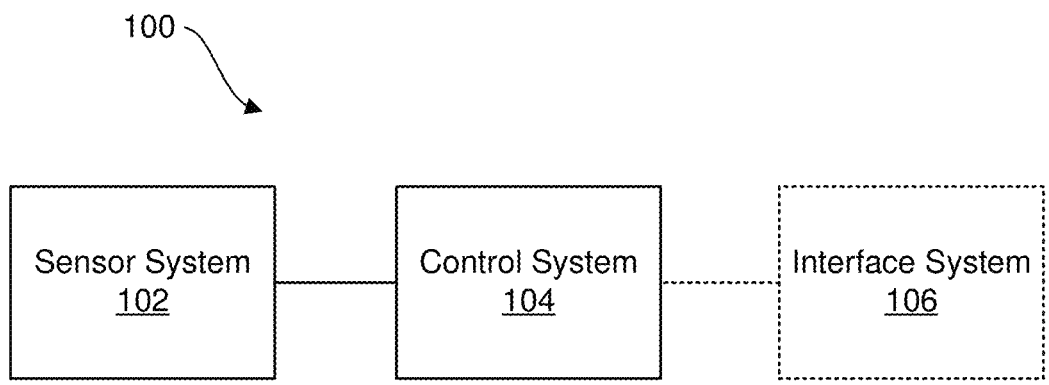
FIG. 1A shows a block diagram representation of components of an example ultrasonic sensing system according to some implementations.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that includes a display. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands and patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Many electronic devices are moving towards flexible displays, smaller or thinner displays, three-dimensional cover glasses, and bezel-less designs. At the same time, more components are being added to such devices or are taking up more real estate in the devices. Some of these components can be heavy, large, and/or expensive. These components often require additional assembly steps. Examples of components in a display device may include an ultrasonic sensor system, an audio speaker or microphone, and a proximity or gesture sensor system. Eliminating or integrating these components into the same hardware may reduce assembly steps and provide increased functionality and space in display devices.

Typically, audio speakers are electrodynamic speakers that pass electrical current through coils of a wire in the presence of a magnetic field. Attractive and repulsive forces are used to move a speaker cone that creates disturbances in the air. Piezoelectric materials may function as audio speakers because an electric field applied to a piezoelectric material can cause the piezoelectric material to change shape, causing disturbances in air and generating sound. Piezoelectric audio speakers are an attractive alternative to electrodynamic speakers because they are generally thinner and lighter and consume less power. However, piezoelectric audio speakers ordinarily produce less sound pressure and poorer sound quality than electrodynamic speakers.

Proximity or gesture detection sensors may be implemented in display devices. Ordinarily, proximity or gesture detection sensors may be capacitive, inductive, magnetic, or optical sensors, among other types. Piezoelectric materials may generate acoustic waves that are reflected by an object for object detection. Effective object detection may depend on acoustic wave properties and sensitivity of a receiver.

An apparatus of the present disclosure integrates an ultrasonic sensor system in a mobile device with one or both of an audio speaker/microphone system and a proximity sensing system. The ultrasonic sensor system includes a piezoelectric polymer layer coupled to an electrode layer. Accordingly, the mobile device is incorporated with existing circuitry for authenticating a user using ultrasonic fingerprint technology. However, rather than adding additional circuitry and hardware for a speaker/microphone system and a proximity sensor system, these systems may be implemented with the existing hardware of the ultrasonic sensor system. The piezoelectric polymer layer may be configured to operate in a d33 stretching mode or a d31 bending mode so that the piezoelectric polymer layer may be electrically driven to operate in the Megahertz (MHz) range for ultrasonic sensing in the d33 stretching mode, and also operate in either the sub-MHz range for proximity sensing in the d31 bending mode or the sub-kilohertz (kHz) to kHz range as an audio speaker/microphone in the d31 bending mode. Alternatively, an additional piezoelectric polymer layer may be formed adjacent to the ultrasonic sensor system or underlying the ultrasonic sensor system, where the additional piezoelectric polymer layer may be configured to operate in the d31 bending mode so that the additional piezoelectric polymer layer may be electrically driven to operate in either the sub-MHz range for proximity sensing or the sub-kHz to kHz range as an audio speaker/microphone. Just as the ultrasonic sensor system may be provided "under display" or "in display" so that fingerprint scans can be performed in a display area of the mobile device, the speaker/microphone system and/or the proximity sensor system may be provided "under display" or "in display."

Generally speaking, piezoelectric materials, and especially piezoelectric polymer materials, transmit low acoustic pressure for speaker sound and proximity sensing. Returning signals also need to propagate through a high impedance media for microphone sound and proximity sensing. As a result, piezoelectric materials typically used in ultrasonic sensor systems are deficient in sound quality and proximity detection. Piezoelectric ceramics may offer improvement in acoustic pressure and quality compared to piezoelectric polymers, but existing piezoelectric ceramics are comparatively poorer in acoustic pressure and quality compared to existing technologies. Piezoelectric polymers are even worse but are cheaper and more flexible than piezoelectric ceramics.

Improvements to the sound output or receiver sensitivity can be made by using one or more approaches. These improvements can be implemented in a piezoelectric layer integrated in an ultrasonic sensor film stack, adjacent to the ultrasonic sensor film stack, or underlying or attached to the ultrasonic sensor film stack. In some implementations, a piezoelectric layer may span a large area. In some implementations, multiple piezoelectric layers may be arranged in a film stack. This provides more than one active layer. Multiple piezoelectric layers may be driven in a uni-pole manner, meaning that all the piezoelectric layers are driven in the same polarity. Or, the multiple piezoelectric layers may be driven in a bi-pole manner, meaning that alternating piezoelectric layers are driven in opposite polarities. In some implementations, the piezoelectric layer may be attached in the mobile device using a stiff epoxy adhesive layer for improving sound output. For instance, multiple piezoelectric layers may be attached to one another using stiff epoxy adhesives. In some implementations, a spacer layer may be added in a film stack with one or more piezoelectric layers to function as an additional resonator. The spacer layer may have a certain thickness or be composed of a specific material to modulate the sound output. In some implementations, one or more mass features may be added to attach to one or more piezoelectric layers or attach to a backside of an ultrasonic sensor film back to function as an additional resonator. The one or more mass features may have a certain geometry or be composed of a specific material to modulate the sound output. In some implementations, a TFT layer in an ultrasonic sensor film stack may be reduced in thickness to increase sound output. For example, the TFT layer may be equal to or less than about 250 µm. In some implementations, a TFT layer in an ultrasonic sensor film stack may be reduced in thickness and a piezoelectric layer in the ultrasonic sensor film stack may be increased in thickness to increase receiver sensitivity of the piezoelectric layer. In some implementations, an array of pixel electrodes in a TFT layer may be reduced in area to increase receiver sensitivity of the piezoelectric layer.

A piezoelectric layer is integrated in a mobile device with an ultrasonic sensor system to function as one or both of an audio speaker/microphone and a proximity sensor, where sound output can be improved or modulated using various approaches mentioned above. It will be understood that "sound power," "sound output," "sound pressure," "acoustic power," "acoustic output," and "acoustic pressure" may be used interchangeably in the present disclosure. It will be understood that modulating the sound output may entail boosting (amplifying) signal output in certain frequency ranges, dampening signal output in certain frequency ranges, or shifting a peak frequency to a different frequency. Amplifying or dampening signal output within one or more frequency ranges may occur in a needed or desired frequency range such as the human audible range (i.e., between about 20 Hz and about 20 kHz). In some instances, the impact on other frequency ranges such as the ultrasonic range may be different than the human audible range. With respect to shifting peak frequency, the peak frequency may be shifted to a frequency outside the human audible range.

FIG. 1A shows a block diagram representation of components of an example ultrasonic sensing system 100 according to some implementations. As shown, the ultrasonic sensing system 100 may include a sensor system 102 and a control system 104 electrically coupled to the sensor system 102. The sensor system 102 may be capable of scanning an object and providing raw measured image data usable to obtain an object signature such as, for example, a fingerprint of a human finger. The control system 104 may be capable of controlling the sensor system 102 and processing the raw measured image data received from the sensor system. In some implementations, the ultrasonic sensing system 100 may include an interface system 106 capable of transmitting or receiving data, such as raw or processed measured image data, to or from various components within or integrated with the ultrasonic sensing system 100 or, in some implementations, to or from various components, devices or other systems external to the ultrasonic sensing system.

Figure 1B:
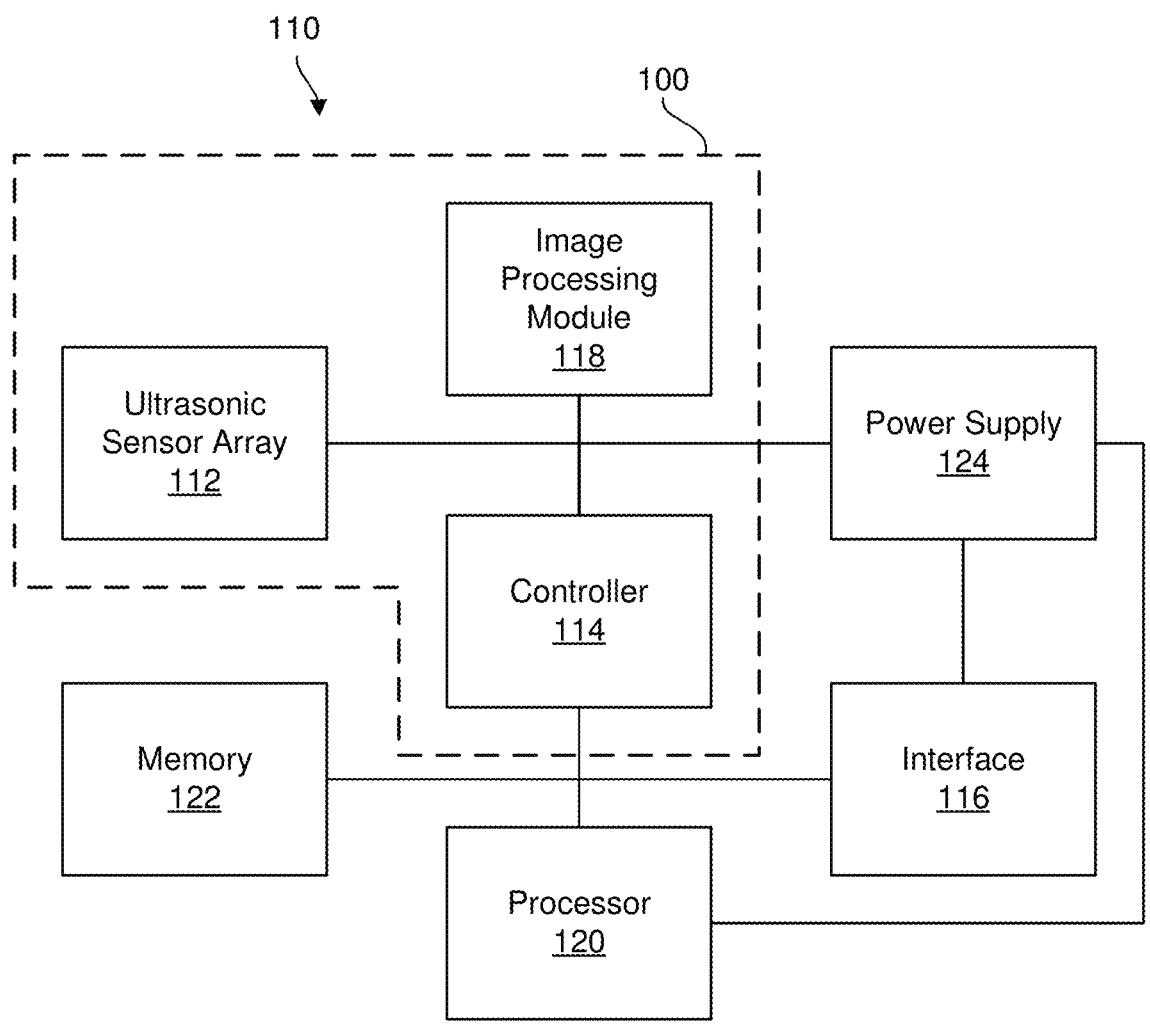
FIG. 1B shows a block diagram representation of components of an example mobile device that includes the ultrasonic sensing system of FIG. 1A.

FIG. 1B shows a block diagram representation of components of an example mobile device 110 that includes the ultrasonic sensing system 100 of FIG. 1A. The sensor system 102 of the ultrasonic sensing system 100 of the mobile device 110 may be implemented with an ultrasonic sensor array 112. The control system 104 of the ultrasonic sensing system 100 may be implemented with a controller 114 that is electrically coupled to the ultrasonic sensor array 112. While the controller 114 is shown and described as a single component, in some implementations, the controller 114 may collectively refer to two or more distinct control units or processing units in electrical communication with one another. In some implementations, the controller 114 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The ultrasonic sensing system 100 of FIG. 1B may include an image processing module 118. In some implementations, raw measured image data provided by the ultrasonic sensor array 112 may be sent, transmitted, communicated or otherwise provided to the image processing module 118. The image processing module 118 may include any suitable combination of hardware, firmware and software configured, adapted or otherwise operable to process the image data provided by the ultrasonic sensor array 112. In some implementations, the image processing module 118 may include signal or image processing circuits or circuit components including, for example, amplifiers (such as instrumentation amplifiers or buffer amplifiers), analog or digital mixers or multipliers, switches, analog-to-digital converters (ADCs), passive filters or active analog filters, among others. In some implementations, one or more of such circuits or circuit components may be integrated within the controller 114, for example, where the controller 114 is implemented as a system-on-chip (SoC) or system-in-package (SIP). In some implementations, one or more of such circuits or circuit components may be integrated within a DSP included within or coupled to the controller 114. In some implementations, the image processing module 118 may be implemented at least partially via software. For example, one or more functions of, or operations performed by, one or more of the circuits or circuit components just described may instead be performed by one or more software modules executing, for example, in a processing unit of the controller 114 (such as in a general-purpose processor or a DSP). In some implementations, the image processing module 118 or portions thereof may be implemented in software that may run on an applications processor such as processor 120 associated with the mobile device 110. The applications processor may have a dedicated coprocessor and/or software modules for secure processing of the biometric image data within the applications processor.

In some implementations, in addition to the ultrasonic sensing system 100, the mobile device 110 may include a separate processor 120, a memory 122, an interface 116 and a power supply 124. In some implementations, the controller 114 of the ultrasonic sensing system 100 may control the ultrasonic sensor array 112 and the image processing module 118, and the processor 120 of the mobile device 110 may control other components of the mobile device 110. In some implementations, the processor 120 communicates data to the controller 114 including, for example, instructions or commands. In some such implementations, the controller 114 may communicate data to the processor 120 including, for example, raw or processed image data (also referred to as "image information"). It should also be understood that, in some other implementations, the functionality of the controller 114 may be implemented entirely, or at least partially, by the processor 120. In some such implementations, a separate controller 114 for the ultrasonic sensing system 100 may not be required because the functions of the controller 114 may be performed by the processor 120 of the mobile device 110.

Depending on the implementation, one or both of controller 114 and processor 120 may store data in the memory 122. For example, the data stored in the memory 122 may include raw measured image data, filtered or otherwise processed image data, estimated image data, or final refined image data. The memory 122 may store processor-executable code or other executable computer-readable instructions capable of execution by one or both of controller 114 and the processor 120 to perform various operations (or to cause other components such as the ultrasonic sensor array 112, the image processing module 118, or other modules to perform operations), including any of the calculations, computations, estimations or other determinations described herein. It should also be understood that the memory 122 may collectively refer to one or more memory devices (or "components"). For example, depending on the implementation, the controller 114 may have access to and store data in a different memory device than the processor 120. In some implementations, one or more of the memory components may be implemented as a NOR- or NAND-based flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 114 or the processor 120 may communicate data stored in the memory 122 or data received directly from the image processing module 118 through an interface 116. For example, such communicated data can include image data or data derived or otherwise determined from image data. The interface 116 may collectively refer to one or more interfaces of one or more various types. In some implementations, the interface 116 may include a memory interface for receiving data from or storing data to an external memory such as a removable memory device. Additionally or alternatively, the interface 116 may include one or more wireless network interfaces or one or more wired network interfaces enabling the transfer of raw or processed data to, as well as the reception of data from, an external computing device, system or server.

A power supply 124 may provide power to some or all of the components in the mobile device 110. The power supply 124 may include one or more of a variety of energy storage devices. For example, the power supply 124 may include a rechargeable battery, such as a nickel-cadmium battery or a lithium-ion battery. Additionally or alternatively, the power supply 124 may include one or more supercapacitors. In some implementations, the power supply 124 may be chargeable (or "rechargeable") using power accessed from, for example, a wall socket (or "outlet") or a photovoltaic device (or "solar cell" or "solar cell array") integrated with the mobile device 110. Additionally or alternatively, the power supply 124 may be wirelessly chargeable. The power supply 124 may include a power management integrated circuit and a power management system.

As used hereinafter, the term "processing unit" refers to any combination of one or more of a controller (for example, the controller 114), an image processing module (for example, the image processing module 118), or a separate processor of a device that includes the ultrasonic system (for example, the processor 120). In other words, operations that are described below as being performed by or using a processing unit may be performed by one or more of a controller of the ultrasonic system, an image processing module, or a separate processor of a device that includes the ultrasonic sensing system.

Figure 1C:
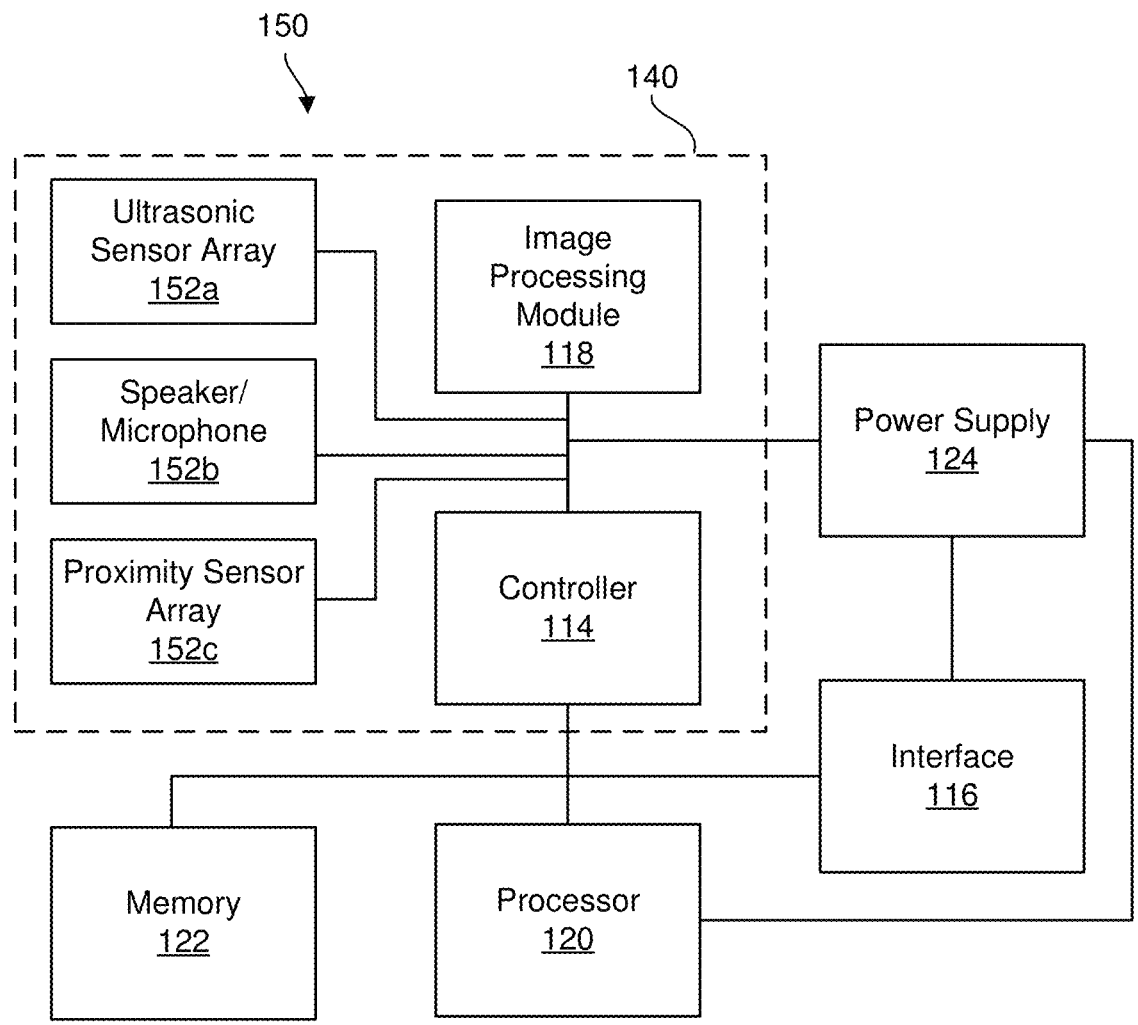
FIG. 1C shows a block diagram representation of components of an example mobile device that includes an ultrasonic sensor array, audio speaker/microphone, and proximity sensor array according to some implementations.

FIG. 1C shows a block diagram representation of components of an example mobile device that includes an ultrasonic sensor array, speaker/microphone, and proximity sensor array according to some implementations. An ultrasonic sensor system 100 in FIGS. 1A and 1B may be replaced by a multi-functional sensor system 140, where the multi-functional sensor system 140 may include an ultrasonic sensor array 152a, a speaker/microphone 152b, and a proximity sensor array 152c. Ordinarily, the ultrasonic sensor array 152a, the speaker/microphone 152b, and the proximity sensor array 152c exist as discrete components in a mobile device. For instance, the ultrasonic sensor array 152a may be positioned at a "home" button in the mobile device, the speaker/microphone 152b may be positioned adjacent to holes or ports in the mobile device, and the proximity sensor array 152c may be positioned adjacent to a camera in the mobile device. Such an arrangement of components increases form factor and adds to manufacturing costs.

In the present disclosure, each of the ultrasonic sensor array 152a, the speaker/microphone 152b, and the proximity sensor array 152c may share one or more piezoelectric layers for generating acoustic waves and receiving reflections of acoustic waves. Thus, it will be understood that the ultrasonic sensor array 152a, the speaker/microphone 152b, and the proximity sensor array 152 do not necessarily constitute separate components, but may represent a single acoustic sensor system with one or more piezoelectric layers that can switch among different modes of operation. The controller 114 may drive a piezoelectric layer in either a d33 stretching mode or a d31 bending mode. In the d33 stretching mode, the controller 114 may drive a piezoelectric layer to function as (1) an ultrasonic sensor in the ultrasonic sensor array 152a. In the d31 bending mode, the controller 114 may drive a piezoelectric layer to function as (2) an audio speaker/microphone 152b, or (3) a proximity sensor in the proximity sensor array 152c. As an ultrasonic sensor, the one or more piezoelectric layers are configured to transmit ultrasonic waves and receive reflections of ultrasonic waves to authenticate a person's finger to the mobile device 110. As an audio speaker/microphone, the one or more piezoelectric layers are configured to transmit acoustic waves in an audible range for humans as a speaker or receive acoustic waves in the audible range for humans as a microphone. As a proximity sensor, the one or more piezoelectric layers are configured to detect an object or gesture in proximity to the mobile device 110 using acoustic waves.

The controller 114 may apply different voltages to drive the one or more piezoelectric layers. Depending on the voltage applied, the one or more piezoelectric layers may be driven in a either a d33 resonating mode or a d31 resonating mode. The d33 resonating mode and the d31 resonating mode refer to modes of excitation. In the d33 resonating mode, the electric field is parallel to the applied stress, resulting in oscillatory motions that involve stretching and contracting motions. This may also be referred to as a d33 stretching mode. In the d31 resonating mode, the electric field is perpendicular to the applied stress, resulting in oscillatory motions that involve bending motions. This may also be referred to as a d31 bending mode. As discussed below, the one or more piezoelectric layers may be driven to produce acoustic waves in certain frequency ranges depending on whether the one or more piezoelectric layers are driven in the d33 stretching mode or the d31 bending mode. For example, in the d33 stretching mode, a piezoelectric layer may produce acoustic waves in the ultrasonic frequency range that is between about 1 MHz and about 100 MHz. In the d31 bending mode, a piezoelectric layer may produce acoustic waves in a human audible range between about 20 Hz and about 20 kHz or in a gesture detection range between about 20 kHz and about 1 MHz.

Figure 2:
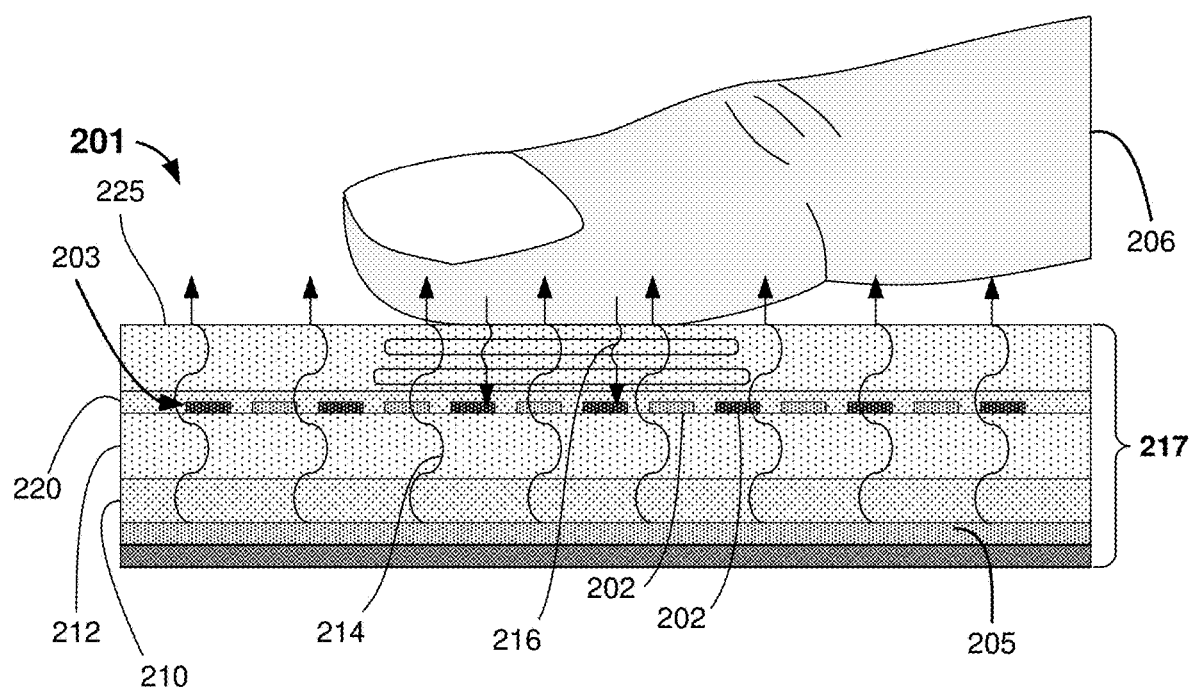
FIG. 2 shows a cross-sectional schematic view of an example apparatus having an ultrasonic fingerprint sensor system for ultrasonic fingerprint imaging according to some implementations.

FIG. 2 shows a cross-sectional schematic view of an apparatus having an ultrasonic fingerprint sensor system for ultrasonic fingerprint imaging according to some implementations. An ultrasonic sensor system 201 includes an ultrasonic transmitter 205 that is separate from an ultrasonic receiver array 202. In some implementations, the ultrasonic transmitter 205 may include a piezoelectric transmitter layer with transmitter excitation electrodes disposed on each side of the piezoelectric transmitter layer. In this example, the target object is a finger 206 being insonified by transmitted ultrasonic waves 214.

In this example, the transmitted ultrasonic waves 214 have been transmitted from the ultrasonic transmitter 205 through a sensor stack 217 and into an overlying finger 206. The various layers of the sensor stack 217 may, in some examples, include one or more substrates of glass or other material (such as plastic or sapphire) that is substantially transparent to visible light. The sensor stack 217 includes a substrate 210. The substrate 210 is coupled to a TFT substrate 212.

In some examples, the ultrasonic receiver array 202 may include an array of pixel input electrodes and sensor pixels formed in part from TFT circuitry, an overlying piezoelectric receiver layer 220 of piezoelectric material such as PVDF or PVDF-TrFE, and an upper electrode layer positioned on the piezoelectric receiver layer 220, which will sometimes be referred to herein as a receiver bias electrode.

Figure 3:
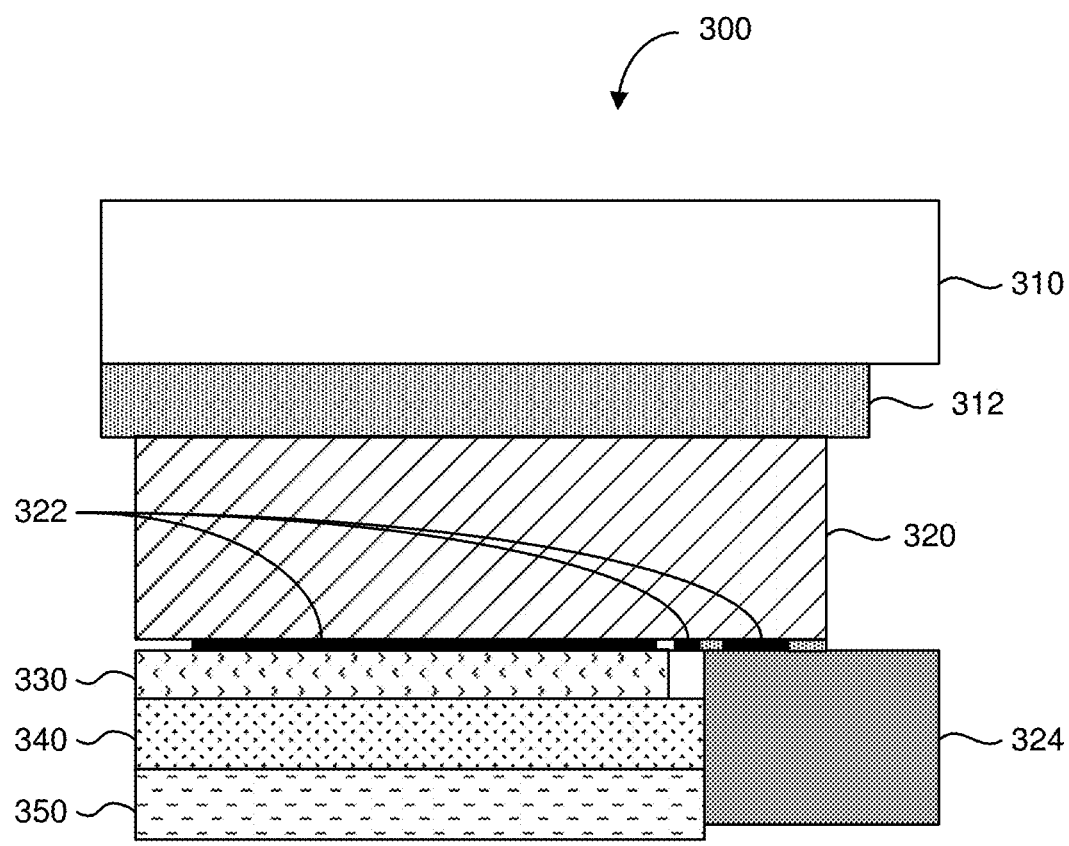
FIG. 3 shows a cross-sectional schematic illustration of an example apparatus including an ultrasonic sensor system with a piezoelectric polymer layer underlying a display, where the piezoelectric polymer layer is configured to operate in either a d33 stretching mode or d31 bending mode according to some implementations.

FIG. 3 shows a cross-sectional schematic illustration of an example apparatus including an ultrasonic sensor system with a piezoelectric polymer layer underlying a display, where the piezoelectric polymer layer is configured to operate in either a d33 stretching mode or d31 bending mode according to some implementations. The apparatus may be a mobile device 300. The mobile device 300 may include a display 310. Though not shown, the mobile device 300 may further include a platen, where the display 310 is underlying the platen. In some implementations, the display 310 may include a DMS-based display, an LED display, an OLED display, an LCD, a plasma display, an IMOD-based display, or another type of display suitable for use in conjunction with a touch-sensitive user interface. The mobile device 300 may further include a TFT substrate or TFT layer 320 underlying the display 310. The TFT layer 320 may be coupled to the display 310 by an adhesive layer 312. In some implementations, the TFT layer 320 includes a plurality of sensor circuits or sensor pixel circuits 322 arranged in an array. In some implementations, the TFT layer 320 may include a rigid substrate material such as glass or a flexible substrate material such as plastic. A printed circuit 324 (e.g., flexible printed circuit) may be coupled to the TFT layer 320 and may be electrically coupled to one or more sensor circuits 322. As shown in FIG. 3, the printed circuit 324 may be a chip-on flex circuit and may be positioned adjacent to the TFT layer 320. The printed circuit 324 may also be referred to as an electronics layer, where the electronics layer may include controllers, processors, memory, and other circuitry components.

The mobile device 300 further includes an ultrasonic sensor system (or acoustic sensor system), where the ultrasonic sensor system includes the TFT layer 320, a piezoelectric layer 330, and an electrode layer 340. The piezoelectric layer 330 is adjacent to and coupled to the TFT layer 320, where the piezoelectric layer 330 is underlying the display 310. Furthermore, the electrode layer 340 is adjacent to and coupled to the piezoelectric layer 330, where the piezoelectric layer 330 is positioned between the electrode layer 340 and the TFT layer 320. In some implementations, the piezoelectric layer 330 is a piezoelectric polymer layer such as PVDF or PVDF-TrFE copolymer. The piezoelectric layer 330 is configured to generate acoustic waves such as ultrasonic waves. The piezoelectric layer 330 may be driven by signals generated from the printed circuit 324, where the printed circuit 324 may include an ASIC such as a driver chip ASIC. The printed circuit 324 may be configured to provide control signals to the piezoelectric layer 330 as well as to the one or more sensor circuits 322 of the TFT layer 320. In some implementations, a passivation layer 350 is underlying the electrode layer 340 to electrically insulate and protect the electrode layer 340.

The piezoelectric layer 330 may function as a piezoelectric transceiver. As a transmitter, the piezoelectric layer 330 may be driven by a driver chip ASIC change that provides a low frequency signal. The driver chip ASIC applies a voltage that causes excitation of the piezoelectric layer 330 in either the d33 stretching mode or the d31 bending mode. As a receiver, the piezoelectric layer 330 may directly sample reflected acoustic waves. AC signals may be sensed directly by the piezoelectric layer 330, bypassing sensor pixel circuits 322 and the TFT layer 320.

The ultrasonic sensor system of the mobile device 300 may operate not only as an ultrasonic sensor, but also as an audio speaker/microphone and as a proximity sensor. The piezoelectric layer 330 may be driven to operate in different resonating modes, including in the d33 stretching mode and the d31 bending mode. In the d33 stretching mode, the mobile device 300 can operate as an ultrasonic sensor in a first frequency range between about 1 MHz and about 100 MHz. In the d31 bending mode, the mobile device 300 can operate either as an audio speaker or microphone in a second frequency range between about 20 Hz and about 20 kHz or as a proximity sensor in a third frequency range between about 20 kHz and about 1 MHz. Thus, the piezoelectric layer 330 of the mobile device 300 of the present disclosure operates not only in the MHz range, but also in the sub-kHz to sub-MHz range.

Challenges exist in operating a piezoelectric layer in the speaker mode or proximity sensing mode. Many smartphones use magneto-inductive technologies to produce excellent sound output and quality, whereas devices using piezoelectric technologies tend to produce low sound output and poor sound quality. However, applying piezoelectric technologies may be valuable so that such piezoelectric technologies may be integrated with existing hardware, e.g., ultrasonic sensor arrays, and may integrated under the display. Moreover, magneto-inductive technologies often require additional real estate and close contact with the ear to obtain high quality sound output. Utilizing piezoelectric technologies instead of having a separate audio speaker or separate proximity sensor may add significant value to a mobile device.

Piezoelectric layers may produce sound by vibrating the air. More specifically, the piezoelectric layers may function as an audio speaker by vibrating the cover glass or platen of a mobile device, which thereby vibrates the air at a frequency range between about 20 Hz and about 20 kHz. Piezoelectric layers may function as a microphone by receiving acoustic waves in the aforementioned frequency range. Piezoelectric layers may detect objects or contactless gestures by transmitting acoustic waves at a frequency range between about 20 kHz and about 1 MHz, and receive reflections of the acoustic waves when an object is detected.

Piezoelectric layers may be piezoelectric ceramic layers or piezoelectric polymer layers. Some ultrasonic sensor arrays use piezoelectric ceramic layers such as lead zirconate titanate (PZT). In some implementations, the piezoelectric ceramic layer includes lead titanate (PT), zinc oxide (ZnO), aluminum nitride (AlN), lithium niobate ($LiNbO_3$), or other piezoelectric ceramic or piezoelectric single crystal. Some ultrasonic sensor arrays use piezoelectric polymer layers such as PVDF or PVDF-TrFE copolymer. However, piezoelectric polymer layers have significantly lower sound output than piezoelectric ceramic layers as shown in Table 1 below.

TABLE 1

| | E31 | Dielectric Constant "epsilon" | Young's Modulus (GPa) | Energy transfer ratio (mechanical energy/ electrical energy) |
|---|---|---|---|---|
| PVDF-TrFE | 0.13 | 9 | 6.5 | 1.00x |
| PZT (thick) | 10 | 600 | 75 | 7.69x |
| PZT (thin) | 10 | 600 | 55 | 10.49x |
| AlN | 1 | 8.5 | 325 | 1.25x |

Figure 4A:
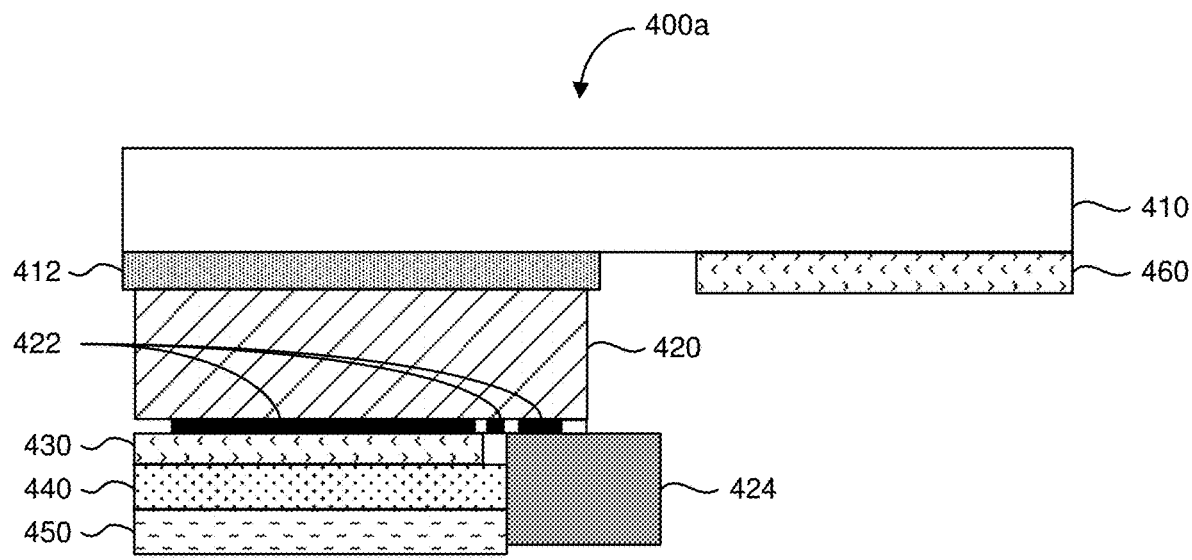
FIG. 4A shows a cross-sectional schematic illustration of an example apparatus including an ultrasonic sensor system with a first piezoelectric polymer layer underlying a display, where the apparatus further includes a second piezoelectric polymer layer integrated under the display in a separate region from the ultrasonic sensor system according to some implementations.

FIG. 4A shows a cross-sectional schematic illustration of an example apparatus including an ultrasonic sensor system with a first piezoelectric polymer layer underlying a display, where the apparatus further includes a second piezoelectric polymer layer integrated under the display in a separate region from the ultrasonic sensor system according to some implementations. FIG. 4A is similar to FIG. 3 except that a second piezoelectric layer is integrated in the mobile device apart from an ultrasonic sensor system. Various aspects of FIG. 4A and its components are described in FIG. 3. In FIG. 4A, a first piezoelectric layer may serve the function of ultrasonic sensing, whereas a second piezoelectric layer may serve the function of proximity sensing or acting as an audio speaker/microphone.

The apparatus in FIG. 4A may be a mobile device 400a. The mobile device 400a may include a display 410. Though not shown, the mobile device 400a may further include a platen, where the display 410 is underlying the platen. The mobile device 400a may further include a TFT layer 420 underlying the display 410. The TFT layer 420 may be coupled to the display 410 by an adhesive layer 412. In some implementations, the TFT layer 420 includes a plurality of sensor circuits or sensor pixel circuits 422 arranged in an array. A printed circuit 424 (e.g., flexible printed circuit) may be coupled to the TFT layer 420 and may be electrically coupled to one or more sensor circuits 422.

The mobile device 400a further includes an acoustic sensor system, where the acoustic sensor system includes the TFT layer 420, a first piezoelectric layer 430, and an electrode layer 440. The first piezoelectric layer 430 is adjacent to and coupled to the TFT layer 420, where the first piezoelectric layer 430 is underlying the display 410. Furthermore, the electrode layer 440 is adjacent to and coupled to the first piezoelectric layer 430, where the first piezoelectric layer 430 is positioned between the electrode layer 440 and the TFT layer 420. In some implementations, the first piezoelectric layer 430 is a piezoelectric polymer layer such as PVDF or PVDF-TrFE copolymer. In some implementations, a passivation layer 450 is underlying the electrode layer 440 to electrically insulate and protect the electrode layer 440.

The first piezoelectric layer 430 is integrated in the acoustic sensor system. A second piezoelectric layer 460 is mechanically coupled to the display 410, where the second piezoelectric layer 460 is positioned in a separate region of the display 410 from the acoustic sensor system. Put another way, the second piezoelectric layer 460 is located in a separate region of the display 410 from the first piezoelectric layer 430. In some implementations, the second piezoelectric layer 460 is a piezoelectric polymer layer. The second piezoelectric layer 460 may be made of PVDF or PVDF-TrFE copolymer. Alternatively, in some implementations, the second piezoelectric layer 460 may be made of a piezoelectric ceramic layer such as PZT. Though not shown, the second piezoelectric layer 460 may be driven by signals generated from the printed circuit 424.

In some implementations, the second piezoelectric layer 460 may be a piezoelectric transmitter. The second piezoelectric layer 460 as a transmitter may be driven to produce acoustic waves in the ultrasonic frequency, operating in the d33 stretching mode. Moreover, the second piezoelectric layer 460 as a transmitter may be driven to produce acoustic waves in the human audible range (20 Hz to 20 kHz) or in a range for contactless proximity detection (20 kHz to 1 MHz), operating in the d31 bending mode. When the second piezoelectric layer 460 operates as a transmitter of acoustic waves, the first piezoelectric layer 430 may be a piezoelectric receiver. The first piezoelectric layer 430 as a receiver receives reflections of acoustic waves to cause the first piezoelectric layer 430 to change shape, resulting in generation of a surface charge that can be converted to output an electrical signal. The first piezoelectric layer 430 may stretch and contract in the d33 stretching mode or bend in the d31 bending mode.

In some implementations, the second piezoelectric layer 460 may be a piezoelectric transmitter in the d31 bending mode. The first piezoelectric layer 430 may be a piezoelectric receiver in the d31 bending mode. The first piezoelectric layer 430 may be a piezoelectric transmitter in the d33 stretching mode and a piezoelectric receiver in the d33 stretching mode. In some implementations, the second piezoelectric layer 460 may be a piezoelectric receiver and the first piezoelectric layer 430 may be a piezoelectric transmitter in the d31 bending mode and/or the d33 stretching mode. Where the second piezoelectric layer 460 acts as a receiver, various circuitry (not shown) is connected to the second piezoelectric layer 460 for converting and processing reflected acoustic waves into electrical signals.

Figure 4B:
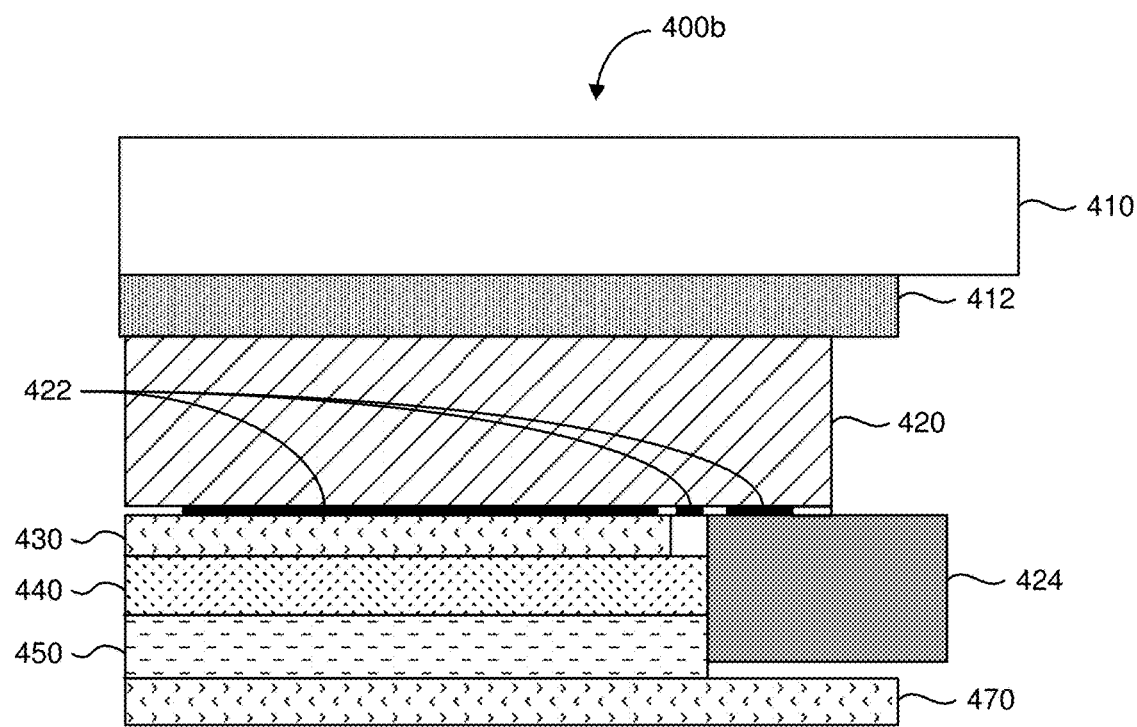
FIG. 4B shows a cross-sectional schematic illustration of an example apparatus including an ultrasonic sensor system with a first piezoelectric polymer layer underlying a display, where the apparatus further includes a second piezoelectric polymer layer integrated in the same region as the ultrasonic sensor system according to some implementations.

FIG. 4B shows a cross-sectional schematic illustration of an example apparatus including an ultrasonic sensor system with a first piezoelectric polymer layer underlying a display, where the apparatus further includes a second piezoelectric polymer layer integrated in the same region as the ultrasonic sensor system according to some implementations. FIG. 4B is similar to FIG. 3 except that a second piezoelectric layer is integrated is integrated in the mobile device in the same region as an ultrasonic sensor system. Various aspects of FIG. 4B and its components are described in FIG. 3. In FIG. 4B, a first piezoelectric layer may serve the function of ultrasonic sensing, whereas a second piezoelectric layer may serve the function of proximity sensing or acting as an audio speaker/microphone. Or, the first piezoelectric layer may serve the function of being a receiver, and the second piezoelectric layer may serve the function of being a transmitter, e.g., ultrasonic transmitter, audio speaker, or gesture detection transmitter.

The apparatus in FIG. 4B may be a mobile device 400b. Aspects of the mobile device 400b including the display 410, the platen (not shown), the TFT layer 420, the adhesive layer 412, the plurality of sensor pixel circuits 422, the printed circuit 424, the first piezoelectric layer 430, the electrode layer 440, and the passivation layer 450 are described above with respect to FIG. 4A. However, rather than having a second piezoelectric layer positioned in a separate region of the display 410 from the ultrasonic sensor system, a second piezoelectric layer 470 is underlying the display 410 in the same region of the display 410 as the ultrasonic sensor system. The ultrasonic sensor system includes the TFT layer 420, the first piezoelectric layer 430, and the electrode layer 440.

The second piezoelectric layer 470 is located in the same region of the display 410 as the first piezoelectric layer 430. In some implementations, the second piezoelectric layer 470 is a piezoelectric polymer layer. The second piezoelectric layer 470 may be made of PVDF or PVDF-TrFE copolymer. Alternatively, in some implementations, the second piezoelectric layer 470 may be made of a piezoelectric ceramic layer such as PZT. Though not shown, the second piezoelectric layer 470 may be driven by signals generated from the printed circuit 424. The second piezoelectric layer 470 may be mechanically coupled to the display 410 via the film stack of the ultrasonic sensor system.

In some implementations, the second piezoelectric layer 470 may be a piezoelectric transmitter. The second piezoelectric layer 470 as a transmitter may be driven to produce acoustic waves in the ultrasonic frequency, operating in the d33 stretching mode. Moreover, the second piezoelectric layer 470 as a transmitter may be driven to produce acoustic waves in the human audible range (20 Hz to 20 kHz) or in a range for contactless proximity detection (20 kHz to 1 MHz), operating in the d31 bending mode. When the second piezoelectric layer 470 operates as a transmitter of acoustic waves, the first piezoelectric layer 430 may be a piezoelectric receiver. The first piezoelectric layer 430 as a receiver receives reflections of acoustic waves to cause the first piezoelectric layer 430 to change shape, resulting in generation of a surface charge that can be converted to output an electrical signal. The first piezoelectric layer 430 may stretch and contract in the d33 stretching mode or bend in the d31 bending mode.

In some implementations, the second piezoelectric layer 470 may be a piezoelectric transmitter in the d31 bending mode. The first piezoelectric layer 430 may be a piezoelectric receiver in the d31 bending mode. The first piezoelectric layer 430 may be a piezoelectric transmitter in the d33 stretching mode and a piezoelectric receiver in the d33 stretching mode. However, it will be understood that in some implementations, the second piezoelectric layer 470 may function as a receiver and the first piezoelectric layer 430 may function as a transmitter.

Figure 5A:
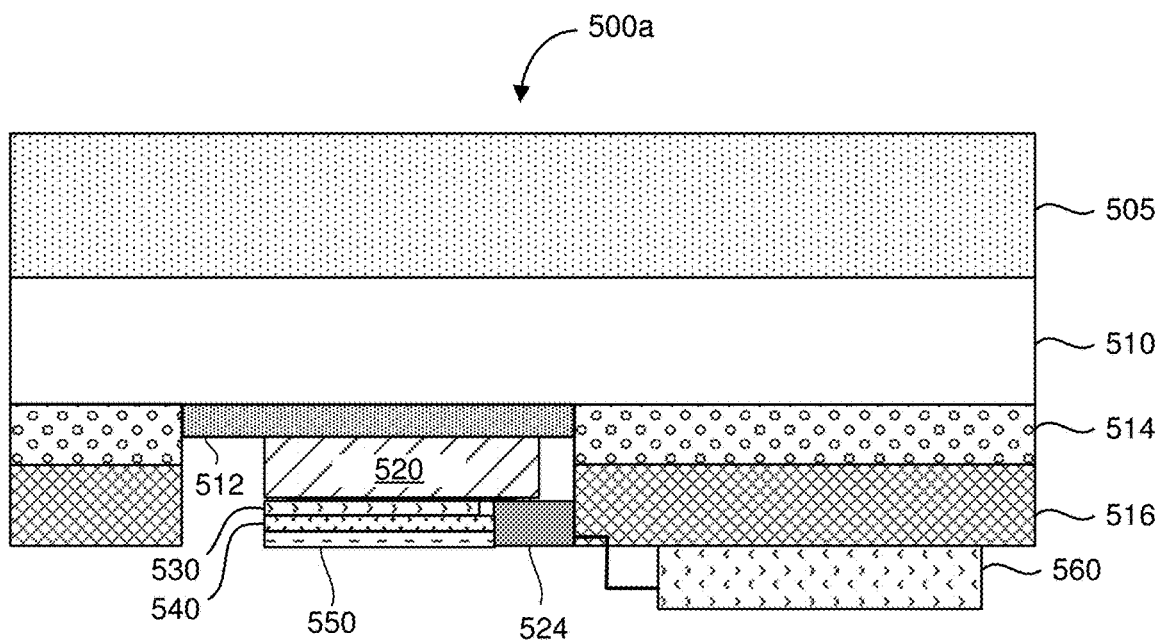
FIG. 5A shows a cross-sectional schematic illustration of an example apparatus including an ultrasonic sensor system, where a piezoelectric layer is underlying a display in a separate region from the ultrasonic sensor system according to some implementations.

FIG. 5A shows a cross-sectional schematic illustration of an example apparatus including an ultrasonic sensor system, where a piezoelectric layer is underlying a display in a separate region from the ultrasonic sensor system according to some implementations. An apparatus may be a mobile device 500a. The mobile device 500a includes a platen 505, which may be a cover plate, cover glass, plastic, or other substrate material. The mobile device 500a further includes a display 510 underlying the platen 505. For instance, the display 510 may be an OLED display. Various layers may support or protect the display 510. Such layers may include a light-blocking layer 514 and an electrical shielding layer 516. The light-blocking layer 514 may be opaque or substantially opaque to visible light. Being substantially opaque or substantially non-transparent as used herein may be defined as absorbance of visible light of about 70% or more, such as about 80% or more, or even about 90% or more. This may prevent or limit transmission of visible light to the back of the mobile device 500a. The electrical shielding layer 516 may include one or more electrically conductive layers and may be electrically grounded. The electrical shielding layer 516 may serve to prevent or limit electrical interference with the display 510. For example, the electrical shielding layer 516 may limit electrical interference from nearby electronics such as a battery charger, digital or analogue electronics, RF components, etc. Further, the electrical shielding layer 516 may provide heat dissipation and improve temperature uniformity at the back of the display 510.

A portion of the display 510 may have an acoustic sensor system directly underlying the display 510 rather than the light-blocking layer 514 and the electrical shielding layer 516. The acoustic sensor system may be coupled to the display 510 via an adhesive 512. The acoustic sensor system may include a TFT layer 520 including a plurality of sensor pixel circuits, a first piezoelectric layer 530 coupled to the TFT layer 520, an electrode layer 540 coupled to the first piezoelectric layer 530 where the first piezoelectric layer 530 is positioned between the electrode layer 540 and the TFT layer 520, and a passivation layer 550 coupled to and underlying the electrode layer 540. An electronics layer 524 such as a printed circuit board may be electrically coupled to the plurality of sensor pixel circuits of the TFT layer 520 and electrically coupled to the electrode layer 540 for driving the first piezoelectric layer 530. A second piezoelectric layer 560 may be positioned in a region of the display 510 separate from the acoustic sensor system. The second piezoelectric layer 560 may be attached to the electrical shielding layer 516. The second piezoelectric layer 560 may be electrically coupled to the electronics layer 524. In some implementations, the second piezoelectric layer 560 may be a piezoelectric polymer layer made of a copolymer such as PVDF or PVDF-TrFE copolymer. In some implementations, the second piezoelectric layer 560 may be a piezoelectric ceramic layer made of a ceramic material such as PZT. In some implementations, the second piezoelectric layer 560 may be electrically driven to operate in the d31 bending mode. In some implementations, the first piezoelectric layer 530 may be electrically driven to operate in the d33 stretching mode. That way, the acoustic sensor system combined with the second piezoelectric layer 560 may enable the mobile device 500a to function as an ultrasonic sensor (e.g., ultrasonic fingerprint sensor), a contactless proximity or gesture detector, and an audio speaker/microphone.

Figure 5B:
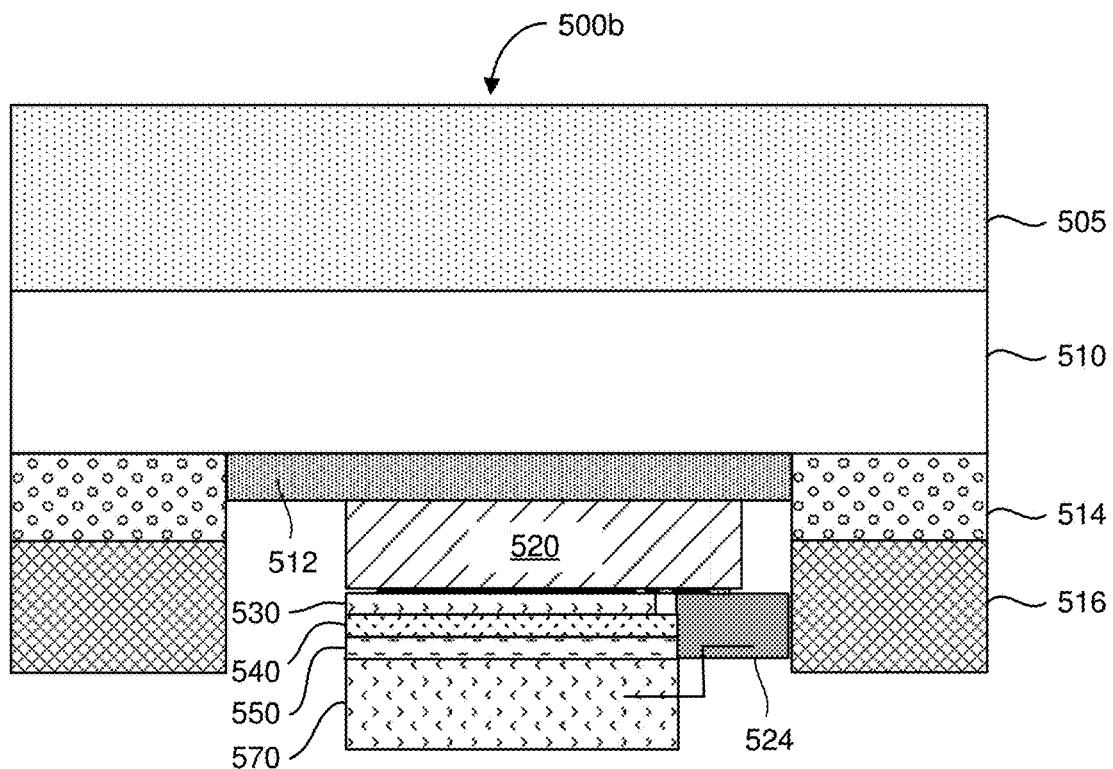
FIG. 5B shows a cross-sectional schematic illustration of an example apparatus including an ultrasonic sensor system, where a piezoelectric layer is underlying a display in the same region as the ultrasonic sensor system according to some implementations.

FIG. 5B shows a cross-sectional schematic illustration of an example apparatus including an ultrasonic sensor system, where a piezoelectric layer is underlying a display in the same region as the ultrasonic sensor system according to some implementations. Aspects of the mobile device 500b in FIG. 5B including the platen 505, the display 510, the adhesive 512, the light-blocking layer 514, the electrical shielding layer 516, the TFT layer 520, the first piezoelectric layer 530, the electrode layer 540, the passivation layer 550, and the electronics layer 524 are described above with respect to the mobile device 500a in FIG. 5A. However, instead of having a second piezoelectric layer in a region of the display 510 separate from the acoustic sensor system, a second piezoelectric layer 570 is underlying the acoustic sensor system in the same region of the display 510. As shown in FIG. 5B, the second piezoelectric layer 570 may be coupled to and attached to the passivation layer 550. The second piezoelectric layer 570 is located in the same region of the display 510 as the first piezoelectric layer 530. In some implementations, the second piezoelectric layer 570 may be a piezoelectric polymer layer made of a copolymer such as PVDF or PVDF-TrFE copolymer. In some implementations, the second piezoelectric layer 570 may be made of a ceramic material such as PZT. In some implementations, the second piezoelectric layer 570 may be electrically driven to operate in the d31 bending mode. In some implementations, the first piezoelectric layer 530 may be electrically driven to operate in the d33 stretching mode. That way, the acoustic sensor system combined with the second piezoelectric layer 570 may enable the mobile device 500b to function as an ultrasonic sensor (e.g., ultrasonic fingerprint sensor), a contactless proximity or gesture detector, and an audio speaker/microphone.

As discussed above, a piezoelectric polymer layer may have low transmitting efficiency, thereby resulting in relatively low output. Piezoelectric transmitter and receiving functions may be separated out as shown in FIGS. 4A, 4B, 5A, and 5B. In some cases, having a piezoelectric ceramic layer as a transmitter and having a piezoelectric polymer layer as a receiver may enable a mobile device to reach a broadband response.

Where a piezoelectric ceramic layer is placed in a separate region of the display as a piezoelectric polymer layer, the signal output is greater than if the piezoelectric polymer layer operated as both a transmitter and receiver. However, where a piezoelectric ceramic layer is placed in the same region of the display as a piezoelectric polymer layer, the signal output is greater than if the piezoelectric ceramic layer were placed in the separate region of the display. Without being limited by any theory, this could suggest that having the piezoelectric ceramic layer underlying the piezoelectric polymer layer in a film stack creates a resonator (or cavity) that boosts or amplifies the signal output.

In implementations where another piezoelectric polymer layer is provided, challenges exist to boost or amplify the signal output as well as to provide a more sensitive receiver. Such challenges also exist if a single piezoelectric polymer layer were provided to operate as a transmitter and receiver.

It may be desirable to utilize one or more piezoelectric polymer layers instead of piezoelectric ceramic layers since polymers such as PVDF or PVDF-TrFE copolymer contain environmentally friendly substances over PZT. The piezoelectric polymer layer(s) may be part of an acoustic sensor stack or coupled to an acoustic sensor stack. The present disclosure provides several design strategies for improving signal output and receiver sensitivity with when using one or more piezoelectric polymer layers for d33 stretching modes and d31 bending modes.

Expanded area: In some implementations, signal output may be amplified by increasing a surface area of a piezoelectric polymer layer. Having an expanded area can increase signal output of an acoustic sensor system as well as increase a receiver sensitivity of the acoustic sensor system. As used herein, an "acoustic sensor system" includes one or more piezoelectric polymer layers, any electrode layers, any TFT layers, and other layers acoustically coupled to the one or more piezoelectric polymer layers. One of the advantages of using a polymer-based piezoelectric material is that such materials may be easily laminated or otherwise formed across a large surface area. A polymer-based piezoelectric material may span a larger area of a display to improve sound output, particularly when operating in a d31 bending mode.

FIG. 6 shows a schematic illustration of a piezoelectric polymer layer spanning a large area of a display according to some implementations. A piezoelectric polymer layer 620 may span a substantial fraction of an area of a display 610. The piezoelectric polymer layer 620 may be underlying the display 610. In some implementations, a major surface of the piezoelectric polymer layer 620 can span more than 50% of a major surface of the display 610, more than 60% of the major surface of the display 610, more than 70% of the major surface of the display 610, or more than 80% of the major surface of the display 610. In FIG. 6, an expanded area can be achieved by arranging multiple piezoelectric polymer layers 620 in parallel, such as in a 2×2 array of piezoelectric polymer layers 620. However, it will be understood that in some implementations, the major surface of the piezoelectric polymer layer 620 may span a small area, such as less than 50% of the major surface of the display 610, less than 20% of the major surface of the display 610, less than 10% of the major surface of the display 610, or less than 5% of the major surface of the display 610.

Multiple layers: In some implementations, signal output may be amplified by arranging multiple layers of piezoelectric polymer layers in a film stack or increasing a thickness of a single piezoelectric polymer layer. Stacking multiple layers or increasing a thickness can increase signal output of an acoustic sensor system as well as increase a receiver sensitivity of the acoustic sensor system. In some implementations, a film stack of the acoustic sensor system includes two or more piezoelectric polymer layers, three or more piezoelectric polymer layers, four or more piezoelectric polymer layers, five or more piezoelectric polymer layers, or ten or more piezoelectric polymer layers. In some implementations, a piezoelectric polymer layer has a thickness that is equal to or greater than a thickness of the electrode layer. In some implementations, a piezoelectric polymer layer has a thickness equal to or greater than about 5 µm, equal to or greater than about 20 µm, equal to or greater than about 30 µm, or between about 5 µm and about 30 µm. In some implementations, larger thicknesses of the piezoelectric polymer layer may increase receiver sensitivity.

Bi-pole or uni-pole driving: In some implementations, signal output may be amplified by driving multiple piezoelectric polymer layers in a film stack in either a uni-pole manner or bi-pole manner. When driving in a uni-pole manner, this means that each of the multiple piezoelectric polymer layers are driven with applied voltages at the same polarities, i.e., either all positive voltages or all negative voltages. For example, if the piezoelectric polymer layer is configured to expand under a positive voltage and contract under a negative voltage, then all the multiple piezoelectric polymer layers will expand together or contract together. When driving in a bi-pole manner, this means that alternating layers of the multiple piezoelectric polymer layers are driving with applied voltages at opposite polarities, i.e., alternating between positive and negative voltages. For example, if the piezoelectric polymer layer is configured to move in one direction under a positive voltage and move in another direction under a negative voltage, then all the multiple piezoelectric polymer layers will alternatingly move in different directions when driven in a bi-pole manner.

FIG. 7A shows a schematic illustration of a uni-pole arrangement of multiple piezoelectric polymer layers so that the piezoelectric polymer layers are driven with the same polarities according to some implementations. A film stack 700a of an acoustic sensor system includes a plurality of piezoelectric polymer layers 705a, 705b, 705c, and 705d. The plurality of piezoelectric polymer layers 705a, 705b, 705c, and 705d are bonded to one another via a plurality of adhesive layers 720a, 720b, 720c, and 720d. The film stack 700a may be attached to a rigid substrate 730 such as a cover glass. As shown in FIG. 7A, each of the plurality of piezoelectric polymer layers 705a, 705b, 705c, and 705d are electrically driven so that the electric field poling is in an "up" direction. This kind of poling can increase signal output.

FIG. 7B shows a schematic illustration of a bi-pole arrangement of multiple piezoelectric polymer layers so that alternating piezoelectric polymer layers are driven at opposite polarities according to some implementations. A film stack 700b of an acoustic sensor system includes a plurality of piezoelectric polymer layers 710a, 710b, 710c, and 710d. The plurality of piezoelectric polymer layers 710a, 710b, 710c, and 710d are bonded to one another via a plurality of adhesive layers 720a, 720b, 720c, and 720d. The film stack 700b may be attached to a rigid substrate 730 such as a cover glass. As shown in FIG. 7B, a first piezoelectric polymer layer 710a and a third piezoelectric polymer layer 710c are electrically driven so that electric field poling is in a "down" direction, and a second piezoelectric polymer layer 710c and a fourth piezoelectric polymer layer 710d are electrically driven so that electric field poling is in an "up" direction. Driving the plurality of piezoelectric polymer layers 710a, 710b, 710c, and 710d in opposite polarities can increase signal output and increase overall receiver sensitivity.

Stiff adhesive: In some implementations, signal output may be amplified by optimizing an adhesive material for bonding multiple piezoelectric polymer layers or bonding a piezoelectric polymer layer to another layer. Having an appropriate adhesive material can increase signal output of an acoustic sensor system. For instance, applying a stiff adhesive layer can increase signal output. Without being limited by any theory, bending a stiff material can cause the layers in an acoustic sensor system to vibrate more dramatically. However, bending a softer or more flexible material may have a tendency to cancel movements in the acoustic sensor system. In some implementations, a stiff adhesive layer may have a Young's modulus equal to or greater than about 0.5 GPa, equal to or greater than about 1.0 GPa, or equal to or greater than about 1.2 GPa. However, a flexible adhesive layer may have a Young's modulus equal to or less than about 0.2 GPa, equal to or less than about 0.1 GPa, or equal to or less than about 0.05 GPa.

Figure 8A:
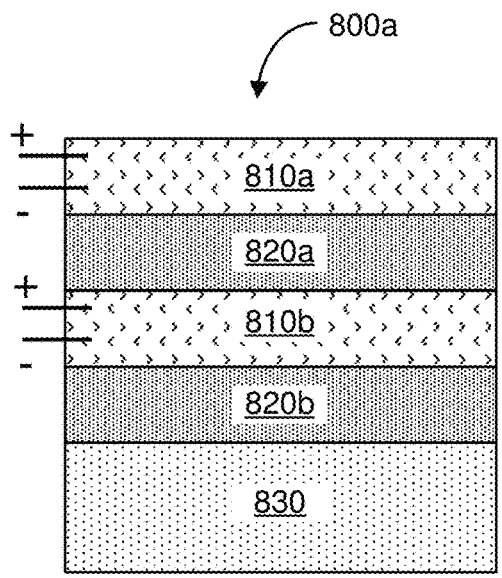
FIG. 8A shows a schematic illustration of an example film stack having multiple piezoelectric polymer layers attached using a flexible adhesive layer according to some implementations.

FIG. 8A shows a schematic illustration of an example film stack having multiple piezoelectric polymer layers attached using a flexible adhesive layer according to some implementations. A film stack 800a of an acoustic sensor system includes at least two piezoelectric polymer layers 810a, 810b. A first piezoelectric polymer layer 810a may be bonded to a second piezoelectric polymer layer 810b with a first adhesive layer 820a. The second piezoelectric polymer layer 810b may be bonded to a rigid substrate 830 such as a cover glass with a second adhesive layer 820b. Each of the first adhesive layer 820a and the second adhesive layer 820b may include a flexible adhesive material such as double-sided tape. However, using flexible adhesive materials may not increase signal output for piezoelectric polymer layers 810a, 810b.

Figure 8B:
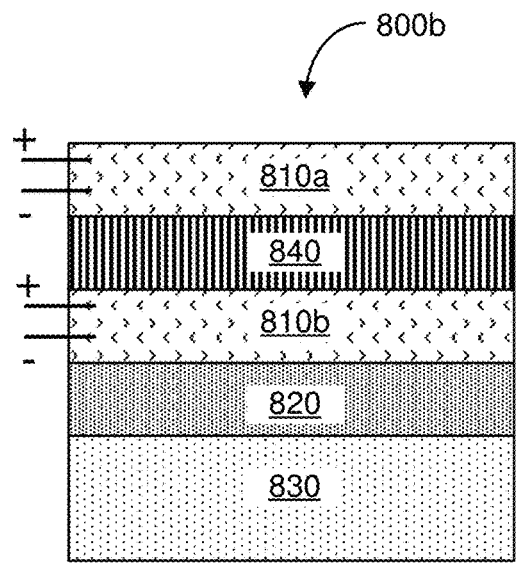
FIG. 8B shows a schematic illustration of an example film stack having multiple piezoelectric polymer layers attached using a stiff epoxy adhesive layer according to some implementations.

FIG. 8B shows a schematic illustration of an example film stack having multiple piezoelectric polymer layers attached using a stiff epoxy adhesive layer according to some implementations. A film stack 800b of an acoustic sensor system includes at least two piezoelectric polymer layers 810a, 810b. A first piezoelectric polymer layer 810a may be bonded to a second piezoelectric polymer layer 810b with a stiff epoxy adhesive layer 840. The second piezoelectric polymer layer 810b may be bonded to a rigid substrate 830 such as a cover glass with a flexible adhesive layer 820. The stiff epoxy adhesive layer 840 may include a stiff epoxy adhesive material such as a cyanoacrylate (e.g., super glue). Other examples of stiff epoxy adhesive materials include LOCTITE® ABLESTIK NCA 3280, Epoxy RBC, and Scotch-Weld™ epoxy adhesive DP270. When operating as an audio speaker, this means that the piezoelectric layers 810a, 810b of the film stack 800b may generate sounds that are louder compared with the piezoelectric layers 810a, 810b of the film stack 800a. The flexible adhesive layer 820 may include a flexible adhesive material such as double-sided tape.

Spacer layer: In some implementations, signal output may be amplified or modulated by adding a spacer layer for acoustic coupling with a piezoelectric polymer layer. The spacer layer may be positioned between the piezoelectric polymer layer and a display. Without being limited by any theory, the spacer layer between the active layer (piezoelectric layer) and the display may function as a resonator or cavity that adjusts signal output in one or more frequency ranges. The spacer layer is not an active layer. In some implementations, the spacer layer includes a plastic, metal, or glass material. In one example, the spacer layer may include polyethylene terephthalate (PET). In another example, the spacer layer may include stainless steel.

The spacer layer may adjust signal output in one or more frequency ranges such as a frequency range between about 20 Hz and about 20 kHz. Thus, the spacer layer between the active layer and the display may boost or amplify signal output in the human audible range. The spacer layer may also adjust the signal output in the ultrasonic range or other frequency ranges. Additionally or alternatively, the spacer layer may dampen the signal output in one or more frequency ranges such as the frequency range between about 20 Hz and about 20 kHz. This ultimately provides a broadband response. Whereas absorbers generally dampen signal output regardless of frequency, the spacer layer may amplify or dampen signal output within a desired frequency range. Additionally or alternatively, the spacer layer may shift the peak frequency of the signal output to a different frequency. For example, the peak frequency may be shifted to a frequency outside the human audible range. The spacer layer may ultimately tune a response of the signal output depending on a material, thickness, geometry, and/or placement of the spacer layer. These parameters provide an additional knob for tuning the signal output behavior, where tuning the signal output behavior can include but is not limited to boosting an output signal in one or more frequency ranges (e.g., human audible range and/or ultrasonic range), dampening a peak of the signal output in one or more frequency ranges (e.g., human audible range and/or ultrasonic range), and/or shifting a peak frequency to a different frequency (e.g., outside the human audible range).

Figure 9A:
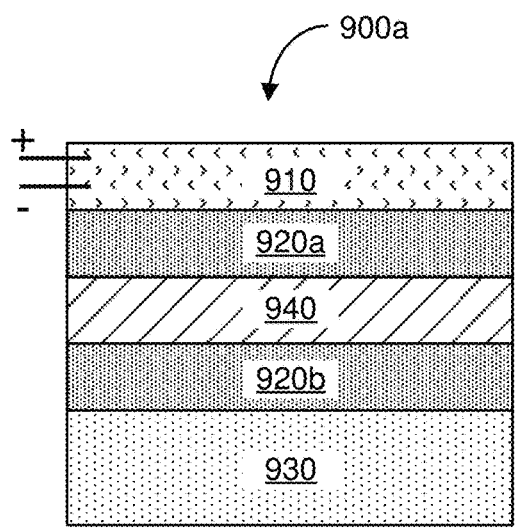
FIG. 9A shows a schematic illustration of an example film stack having a spacer layer made of plastic positioned between a piezoelectric polymer layer and a rigid substrate according to some implementations.

FIG. 9A shows a schematic illustration of an example film stack having a spacer layer made of plastic positioned between a piezoelectric polymer layer and a rigid substrate according to some implementations. A film stack 900a of an acoustic sensor system includes a piezoelectric polymer layer 910, a dielectric spacer layer 940, and a rigid substrate 930 such as a cover glass, where the dielectric spacer layer 940 is positioned between the rigid substrate 930 and the piezoelectric polymer layer 910. The piezoelectric polymer layer 910 is bonded to the dielectric spacer layer 940 using a first adhesive layer 920a, which can be a flexible or stiff adhesive material. The dielectric spacer layer 940 is bonded to the rigid substrate 930 using a second adhesive layer 920b, which can be a flexible or stiff adhesive material. In some implementations, the dielectric spacer layer 940 can include a polymer-based dielectric material such as PET. In some implementations, the dielectric spacer layer 940 can include a dielectric material such as glass.

Figure 9B:
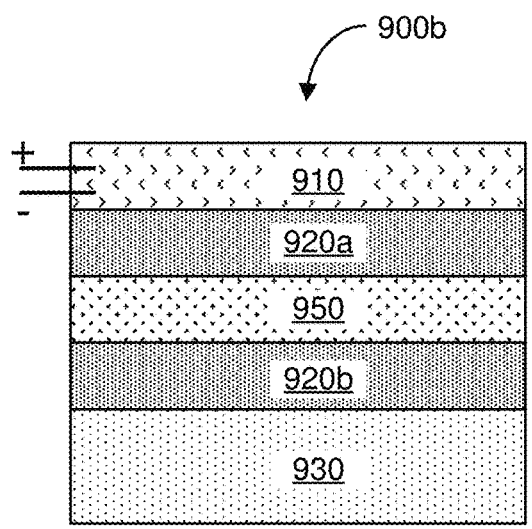
FIG. 9B shows a schematic illustration of an example film stack having a spacer layer made of stainless steel positioned between a piezoelectric polymer layer and a rigid substrate according to some implementations.

FIG. 9B shows a schematic illustration of an example film stack having a spacer layer made of stainless steel positioned between a piezoelectric polymer layer and a rigid substrate according to some implementations. A film stack 900b of an acoustic sensor system includes a piezoelectric polymer layer 910, a metal spacer layer 940, and a rigid substrate 930 such as a cover glass, where the metal spacer layer 940 is positioned between the rigid substrate 930 and the piezoelectric polymer layer 910. The piezoelectric polymer layer 910 is bonded to the metal spacer layer 940 using a first adhesive layer 920a, which can be a flexible or stiff adhesive material. The metal spacer layer 940 is bonded to the rigid substrate 930 using a second adhesive layer 920b, which can be a flexible or stiff adhesive material. In some implementations, the metal spacer layer 940 can include a metallic material such as stainless steel.

Each of the spacer layers 940 and 950 in FIGS. 9A and 9B may be acoustically coupled with the piezoelectric polymer layer 910 in an acoustic sensor system. As shown in FIGS. 9A and 9B, the spacer layers 940 and 950 add more separation between the active layer and the rigid substrate 930. By way of an example, each of the spacer layers 940 and 950 may have a thickness of about 100 µm, thereby adding an additional separation of 100 µm of non-active material from the rigid substrate 930. In some implementations, a thickness of a piezoelectric polymer layer 910 is between about 5 µm and about 40 µm, and a thickness of each of the adhesive layers 920a, 920b is between about 1 µm and about 8 µm. In some implementations, a thickness of the spacer layer 940, 950 is greater than a thickness of the piezoelectric polymer layer 910, at least two times greater than a thickness of the piezoelectric polymer layer 910, at least three times greater than a thickness of the piezoelectric polymer layer 910, or at least five times greater than a thickness of the piezoelectric polymer layer 910. In some implementations, a thickness of the spacer layer 940, 950 is at least two times greater than a thickness of an adhesive layer 920a, 920b, at least five times greater than a thickness of an adhesive layer 920a, 920b, or at least ten times greater than a thickness of an adhesive layer 920a, 920b.

Mass features: In some implementations, signal output may be amplified or modulated by adding one or more mass features with a piezoelectric polymer layer. The one or more mass features may also be referred to as "ballast mass(es)," "backer material(s)," "backing layer(s)," or "backing material(s)." The one or more mass features may include non-active materials that are attached to an active layer such as a piezoelectric polymer layer or underlying a piezoelectric polymer layer so that the one or more features are positioned on a side of the piezoelectric layer facing away from a display. Put another way, the one or more mass features may be attached to a backside of a film stack including a piezoelectric polymer layer, where the backside is facing away from a display of a mobile device. The one or more mass features are additional structures adding mass to the film stack including the piezoelectric polymer layer. The additional mass may amplify or modulate the signal output generated by the piezoelectric polymer layer.

Placement and/or surface area covered may influence the signal output behavior of the piezoelectric polymer layer. In some implementations, the one or more mass features may partially cover a major surface of a backside of a film stack with the piezoelectric polymer layer or a backside of the piezoelectric polymer layer. In some implementations, the one or more mass features may be positioned on outer edges of the backside of the piezoelectric polymer layer or other layer. Geometric shape and composition of the one or more mass features may affect the signal output behavior of the one or more mass features. In some implementations, the one or more mass features include a plastic, metal, or glass material. For example, the one or more mass features can include PET. In some implementations, the one or more mass features are ring-shaped, oval-shaped, or rectangular shaped. In some implementations, the one or more mass features are non-porous (solid) blocks of material.

In some instances, the one or more mass features may adjust the signal output in one or more frequency ranges such as a frequency range between about 20 Hz and about 20 kHz and/or shift a peak frequency of the signal output to a different frequency. For example, the one or more mass features may amplify or dampen the signal output in at least the human audible range and/or shift a peak frequency of the signal output to a frequency outside the human audible range. The signal output behavior may be tuned or controlled by selecting an appropriate material, thickness, geometry, and placement of the one or more mass features. These parameters provide an additional knob for tuning the signal output behavior, where tuning the signal output behavior can include but is not limited to boosting an output signal in one or more frequency ranges (e.g., human audible range and/or ultrasonic range), dampening a peak of the signal output in one or more frequency ranges (e.g., human audible range and/or ultrasonic range), and/or shifting a peak frequency to a different frequency (e.g., outside the human audible range).

Figure 10:
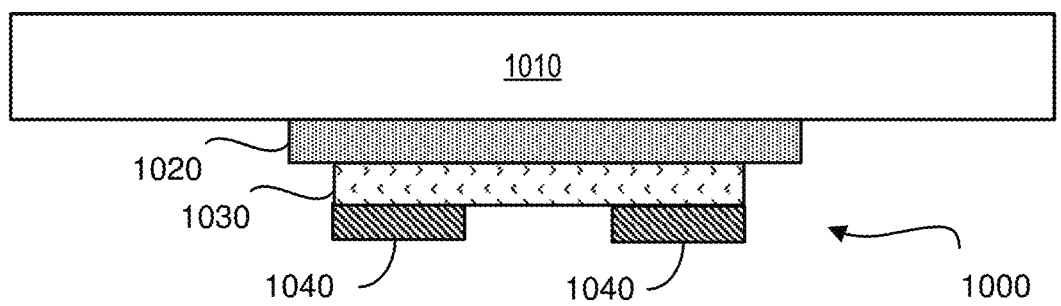
FIG. 10 shows a cross-sectional schematic illustration of a piezoelectric layer underlying a display and having mass features attached to a backside of the piezoelectric layer according to some implementations.

FIG. 10 shows a cross-sectional schematic illustration of a piezoelectric layer underlying a display and having mass features attached to a backside of the piezoelectric layer according to some implementations. A film stack 1000 of an acoustic sensor system may include a piezoelectric polymer layer 1030 and one or more mass features 1040 attached to a backside of the piezoelectric polymer layer 1030. The film stack 1000 may be attached to a display 1010 using an adhesive layer 1020, where the adhesive layer 1020 may include a flexible adhesive material or a stiff adhesive material. The display 1010 may be an OLED display in some implementations. The piezoelectric polymer layer 1030 may include a copolymer such as PVDF or PVDF-TrFE copolymer. The one or more mass features 1040 may be made of a non-active material such as plastic, metal, or glass material. The one or more mass features 1040 may provide additional mass/thickness to the active layer, where the active layer includes the piezoelectric polymer layer 1030. In FIG. 10, the one or more mass features partially cover a major surface of the backside of the piezoelectric polymer layer 1030. The presence of the one or more mass features on the backside of the piezoelectric polymer layer 1030 amplifies or modulates the signal output of the acoustic waves generated by the piezoelectric polymer layer 1030.

Pixel sensing element size: In some implementations, receiver sensitivity of a piezoelectric polymer layer may be increased by reducing a size of pixel sensing elements in a TFT layer. The TFT layer includes a plurality of pixel sensing elements. Pixel sensing elements having smaller areas increase receiver sensitivity of a piezoelectric polymer layer. Pixel sensing elements may also be referred to as pixel electrodes such as pixel input electrodes in FIG. 17A. Without being limited by any theory, receiver sensitivity may be inversely proportional to a stiffness of the TFT layer, and adding more area to the pixel sensing elements may be attributed to increased stiffness in the TFT layer. Given that the TFT layer, the electrode layer, and the piezoelectric polymer layer vibrate together, the stiffness in the TFT layer influences the vibration mode and how much deflection occurs in the particular vibration mode, where how much deflection occurs correlates with receiver sensitivity. Reducing an area occupied by the pixel sensing elements can be accomplished by adding "voids" or filling "voids" made in the pixel sensing elements with flexible material. Such "voids" can be cavities, openings, or empty spaces in the pixel sensing elements. In some implementations, the smaller pixel sensing elements may shift a peak frequency of a frequency response and/or amplify a frequency response in a desired frequency range. In some implementations, a width of a pixel sensing element may be equal to or less than about 20 mm, equal to or less than about 12 mm, or equal to or less than about 8 mm. Ordinarily, the width of a pixel sensing element is greater than about 20 mm. In some implementations, the receiver sensitivity of a piezoelectric polymer layer can be improved in a frequency range for contactless proximity sensing, where the frequency range is between about 20 kHz and about 100 kHz.

Figure 11A:
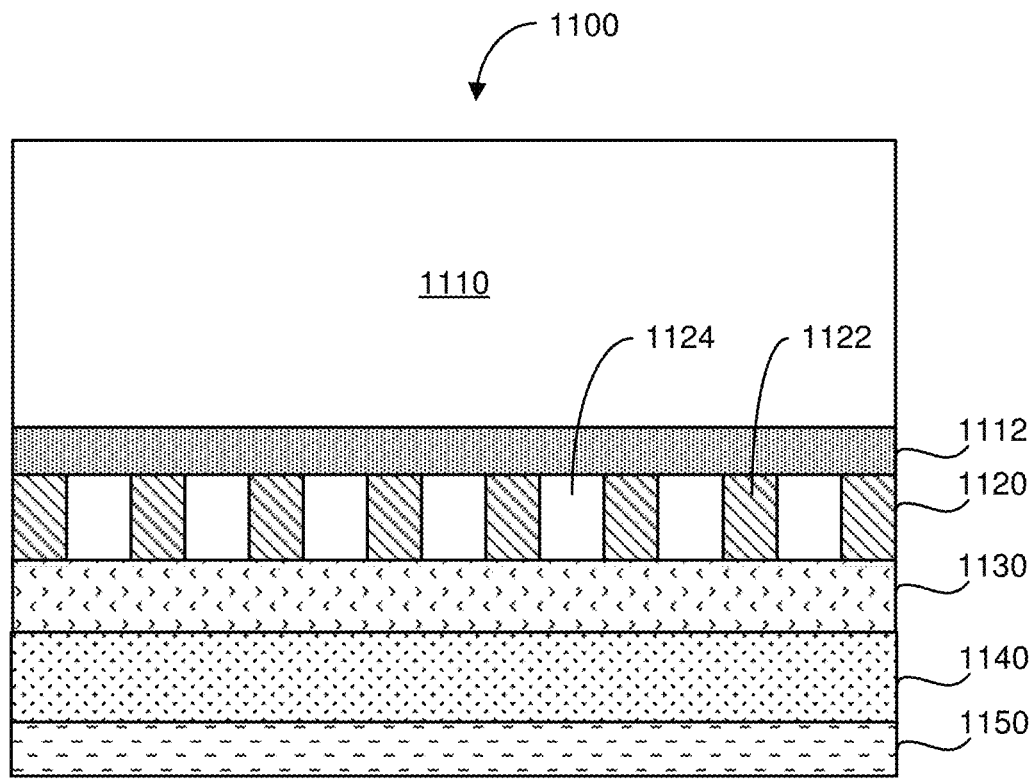
FIG. 11A shows a cross-sectional schematic illustration of an example apparatus including a film stack having a piezoelectric layer and a TFT layer with an array of sensor pixels, the array of sensor pixels having reduced size according to some implementations.

FIG. 11A shows a cross-sectional schematic illustration of an example apparatus including a film stack having a piezoelectric layer and a TFT layer with an array of sensor pixels, the array of sensor pixels having reduced size according to some implementations. The apparatus may be a mobile device 1100. The mobile device 1100 may include a display 1110 such as an OLED display. Though not shown, the mobile device 1100 may further include a platen such as a cover plate or cover glass, where the display 1110 is underlying the platen. The mobile device 1100 includes an acoustic sensor system underlying the display 1110, where the acoustic sensor system includes a TFT layer 1120, a piezoelectric polymer layer 1130, and an electrode layer 1140. The piezoelectric polymer layer 1130 may be positioned between the TFT layer 1120 and the electrode layer 1140, where the TFT layer 1120 may be positioned on a side of the piezoelectric polymer layer 1130 facing towards the display 1110 and the electrode layer 1140 may be positioned on a side of the piezoelectric polymer layer 1130 facing away from the display 1110. The acoustic sensor system may further include a passivation layer 1150 underlying the electrode layer 1140. In some implementations, the mobile device 1100 further includes an adhesive layer 1112 bonding the acoustic sensor system to the display 1110. The TFT layer 1120 of the acoustic sensor system may include an array of sensor pixels 1122.

Rather than occupying an entire surface area of the piezoelectric polymer layer 1130, the array of sensor pixels 1122 occupies over a major surface of the piezoelectric polymer layer 1130 that is only a fraction of the major surface of the piezoelectric polymer layer 1130. The pixel area may be defined according to a spacing between neighboring pixels 1122. In some implementations, the size of the pixel 1122 is equal to or less than about 70%, equal or less than about 50%, equal to or less than about 30% of the distance between two neighboring pixels 1122. Though the piezoelectric polymer layer 1130 may span a large area for increasing transmission efficiency, the array of sensor pixels 1122 may span a small area for increasing receiver sensitivity of the piezoelectric polymer layer 1130. To reduce an area occupied by the array of sensor pixels 1122, unoccupied regions 1124 may be formed between sensor pixels 1122 in the array of sensor pixels 1122. Such unoccupied regions 1124 may be voids (empty spaces) or filled with flexible material. In some implementations, the sensor pixels 1122 may be equally spaced apart.

Figure 11B:
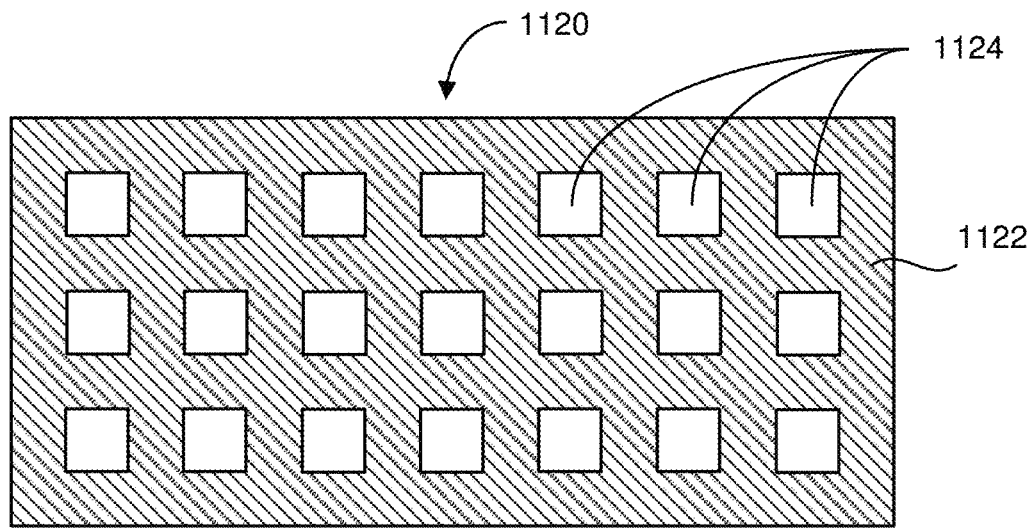
FIG. 11B shows a top view schematic illustration of a TFT layer with an array of sensor pixels having reduced size according to some implementations.

FIG. 11B shows a top view schematic illustration of a TFT layer with an array of sensor pixels having reduced size according to some implementations. The TFT layer 1120 may include an array of sensor pixels 1122. Each of the sensor pixels 1122 may have an unoccupied region 1124. In some implementations, the unoccupied region 1124 may be a hole, cavity, opening, or void. In some implementations, the unoccupied region 1124 may be a filled void with flexible material. As shown in FIG. 11B, the unoccupied region 1124 may be defined in a center of each sensor pixel 1122 so that a material of the sensor pixel 1122 surrounds the unoccupied region 1124. Thus, the sensor pixels 1122 and the unoccupied regions are arranged as an array in the TFT layer 1120.

Thick piezoelectric, thin TFT: In some implementations, signal output may be amplified or modulated by increasing a thickness of a piezoelectric polymer layer and/or decreasing a thickness of a TFT layer. Additionally, receiver sensitivity may be increased by increasing a thickness of the piezoelectric polymer layer and/or decreasing a thickness of the TFT layer. Transmission efficiency and receiver sensitivity may be improved by controlling a ratio of a dielectric layer thickness to piezoelectric polymer layer thickness. In some implementations, the dielectric layer thickness may be tuned by controlling a thickness of the TFT layer. In some cases, the thickness of the TFT layer can be reduced to provide improved receiver sensitivity and transmission efficiency. For example, such improvements can be demonstrated in a frequency range between about 100 Hz and about 20 kHz and in a frequency range between about 20 kHz and about 40 kHz. In other words, thin TFT layers can improve transmission efficiency and receiver sensitivity in a human audible range and a contactless proximity sensing range. In some implementations, the piezoelectric polymer layer thickness can be increased to provide improved transmission efficiency. This can boost a signal output of an acoustic sensor system. For example, improvements can be demonstrated in a frequency range between about 20 kHz and about 40 kHz for contactless proximity sensing.

In some implementations, a thickness of the TFT layer can be equal to or less than about 400 µm, equal to or less than about 250 µm, or equal to or less than about 150 µm. In some implementations, the thickness of the TFT layer may be not more than five times greater or not more than three times greater than a thickness of the piezoelectric polymer layer. In some implementations, a thickness of the piezoelectric polymer layer can be equal to or greater than about 5 µm, equal to or greater than about 20 µm, equal to or greater than about 30 µm, or between about 5 µm and about 30 µm. In some implementations, a ratio of the TFT layer thickness to the piezoelectric polymer layer thickness is about 5:1 or less, about 3:1 or less, or about 2:1 or less.

Figure 12:
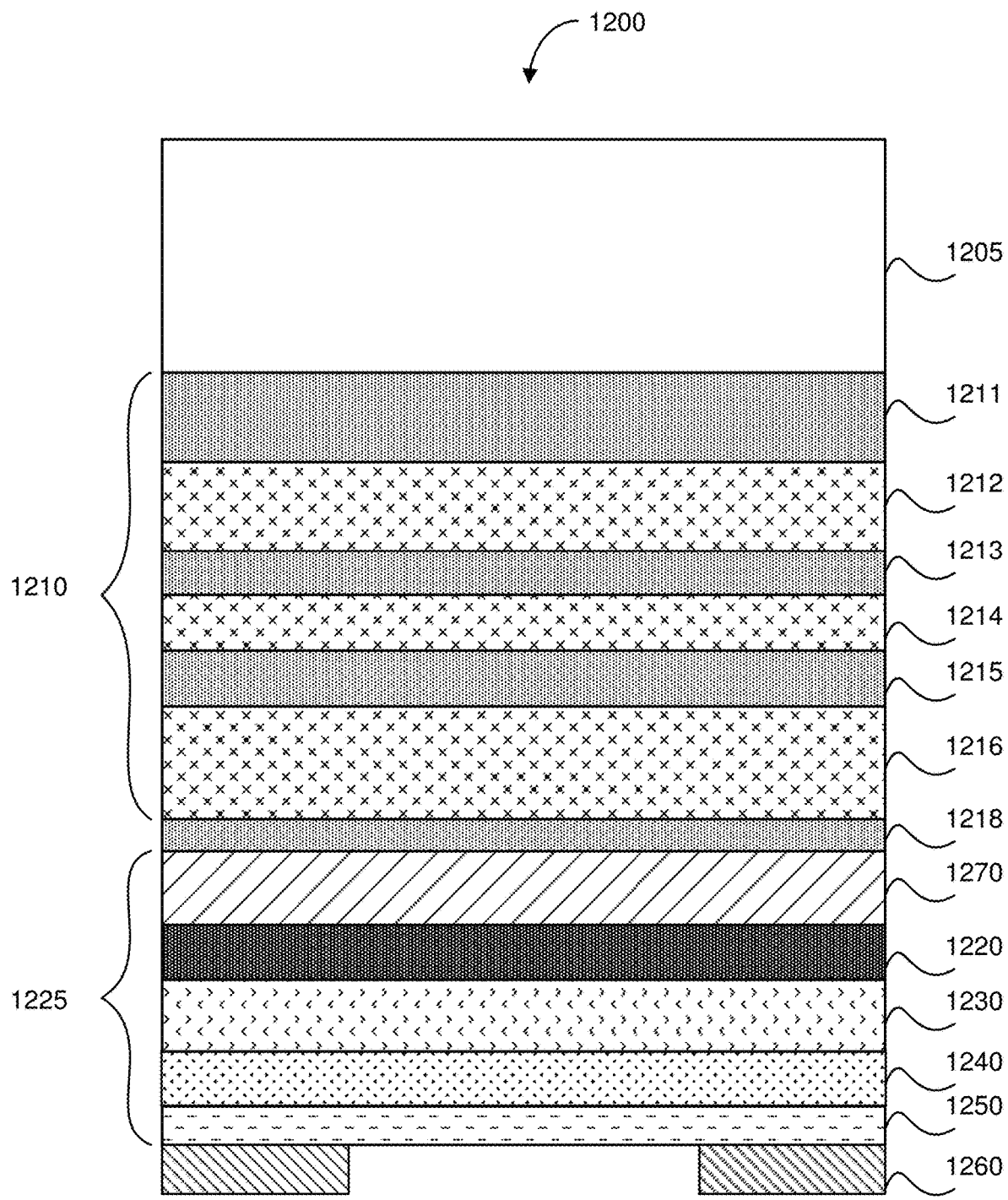
FIG. 12 shows a cross-sectional schematic illustration of an example apparatus including a film stack having a thick piezoelectric polymer layer and a thin TFT layer according to some implementations.

FIG. 12 shows a cross-sectional schematic illustration of an example apparatus including a film stack having a thick piezoelectric polymer layer and a thin TFT layer according to some implementations. The apparatus may be a mobile device 1200. The mobile device 1200 includes a platen 1205 such as a cover plate or cover glass. The mobile device 1200 further includes a display 1210 underlying the platen 1205, where the display 1210 may be an OLED display. The display 1210 may include a plurality of display layers 1211, 1212, 1213, 1214, 1215, and 1216. The display 1210 may be an OLED stack that is a multilayer structure including an optional first adhesive layer 1211, at least two polarizers 1212, 1213, at least an OLED display 1214, an optional second adhesive layer 1215, and at least a backplate 1216. An acoustic sensor system 1225 may be bonded to and underlying the display 1210. An adhesive layer 1218 such as a pressure-sensitive adhesive may bond the acoustic sensor system 1225 to the display 1210. The acoustic sensor system 1225 may include a TFT layer 1220 having a plurality of sensor pixel circuits, a piezoelectric polymer layer 1230, and an electrode layer 1240. The piezoelectric polymer layer 1230 may be positioned between the TFT layer 1220 and the electrode layer 1240, where the TFT layer 1220 is positioned on a side of the piezoelectric polymer layer 1230 facing towards the display 1210 and the electrode layer 1240 is positioned on a side of the piezoelectric polymer layer 1230 facing away from the display 1210. The piezoelectric polymer layer 1230 may include a copolymer such as PVDF or PVDF-TrFE copolymer. In some implementations, the acoustic sensor system 1225 of the mobile device 1200 further includes a spacer layer 1270 between the TFT layer 1220 and the display 1210, where the spacer layer 1270 may amplify or modulate signal output in the piezoelectric polymer layer 1230. The spacer layer 1270 may be made of a non-active material such as a plastic, metal, or glass material. In some implementations, the acoustic sensor system 1225 further includes a passivation layer 1250 underlying the electrode layer 1240. In some implementations, one or more mass features 1260 may be attached to a backside of the acoustic sensor system 1225, where the one or more mass features 1260 may amplify or modulate signal output in the piezoelectric polymer layer 1230. The one or more mass features 1260 may be made of a non-active material such as a plastic, metal, or glass material.

An optimized acoustic sensor system 1225 may have a thick piezoelectric polymer layer 1230 and a thin TFT layer 1220 for optimizing signal output. Increased polymer thickness and reduced dielectric (TFT layer 1220) thickness may boost signal output from the piezoelectric polymer layer 1230. In some implementations, a thickness of the piezoelectric polymer layer 1230 may be equal to or greater than about 5 µm, and a thickness of the TFT layer 1220 may be equal to or less than about 250 µm. In some implementations, a ratio of the TFT layer thickness to the piezoelectric polymer layer thickness is about 5:1 or less, about 3:1 or less, or about 2:1 or less.

Any of the aforementioned designs or strategies may be implemented with a piezoelectric polymer layer or in a piezoelectric polymer layer for improving or modulating signal performance. That way, the piezoelectric polymer layer may have improved sound output and/or increased receiver sensitivity when operating in a d33 stretching mode or d31 bending mode. Such designs or strategies as described above and in FIGS. 6-12 may be implemented in a mobile device with a piezoelectric polymer layer. Any of the aforementioned designs or strategies may be combined in different combinations with one another to improve or modulate signal performance. For example, a larger area may be combined with multiple piezoelectric layers, multiple piezoelectric layers may be combined with having a spacer layer, a larger area may be combined with smaller pixel sensing elements and thick piezoelectric polymer layers, and stiff epoxy adhesive layers may be combined with having a spacer layer, among other possible combinations and configurations. Any of the aforementioned designs and strategies, or any combination of the aforementioned designs and strategies, may be incorporated in a sensor configuration shown in FIG. 3, FIG. 4A, FIG. 4B, FIG. 5A, or FIG. 5B. For instance, though only a single piezoelectric layer 330 is illustrated in FIG. 3, multiple piezoelectric polymer layers may be stacked in a multilayer stack to substitute for the single piezoelectric layer 330.

Figure 13A:
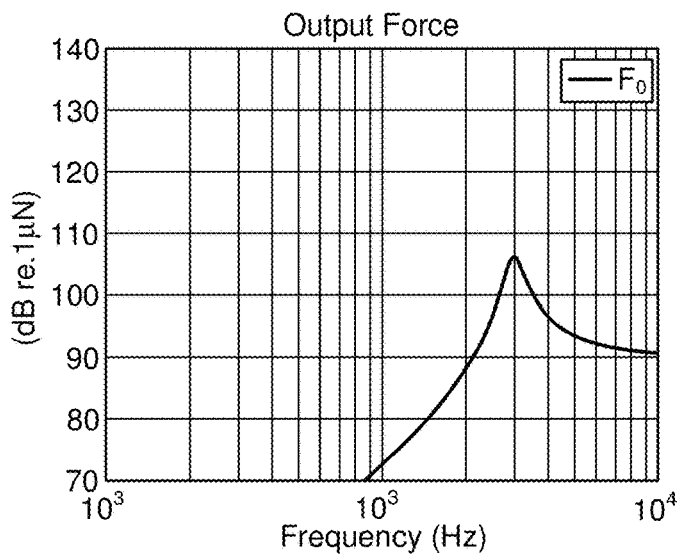
FIG. 13A shows a graph illustrating signal output as a function of frequency for a film stack having a piezoelectric layer of standard size.

FIG. 13A shows a graph illustrating signal output as a function of frequency for a film stack having a piezoelectric layer of standard size. The film stack has a single piezoelectric layer and does not include a spacer layer or mass features. The peak frequency has an amplitude of about 105 dB, where dB is indicative of signal output or sound pressure.

Figure 13B:
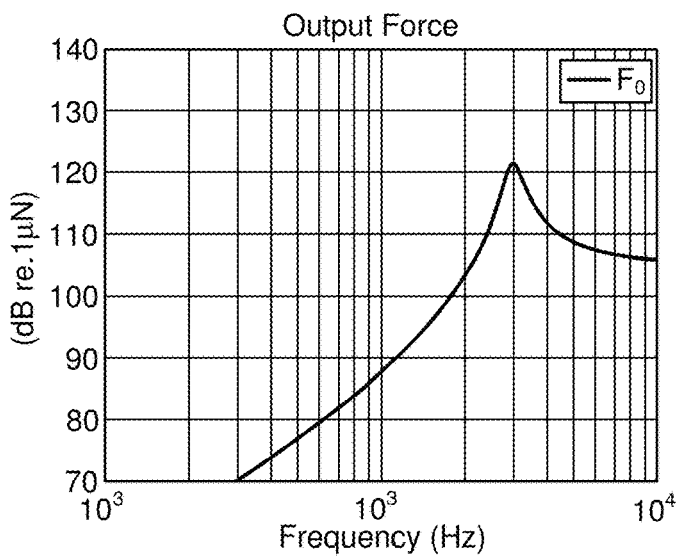
FIG. 13B shows a graph illustrating signal output as a function of frequency for a film stack having 32 piezoelectric layers.

FIG. 13B shows a graph illustrating signal output as a function of frequency for a film stack having 32 piezoelectric layers. The film stack does not include a spacer layer or mass features. Increasing a number of piezoelectric layers in a film stack increases signal output or sound pressure from about 105 dB to about 120 dB at the same peak frequency as FIG. 13A.

Figure 13C:
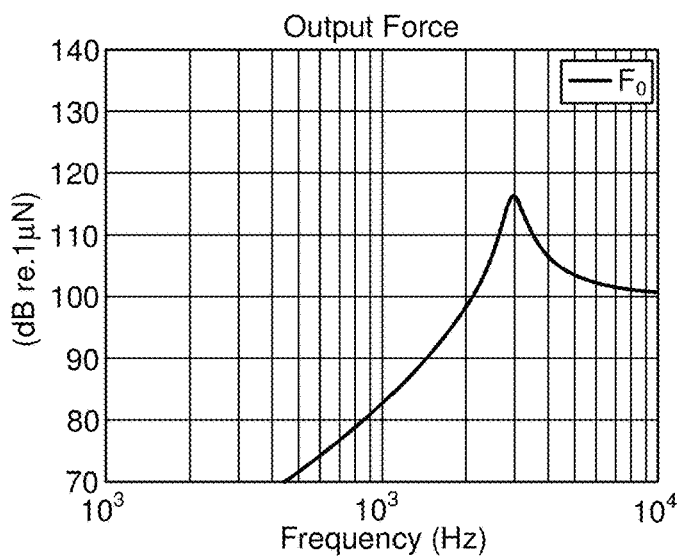
FIG. 13C shows a graph illustrating signal output as a function of frequency for a film stack having 10 piezoelectric layers.

FIG. 13C shows a graph illustrating signal output as a function of frequency for a film stack having 10 piezoelectric layers. The film stack does not include a spacer layer or mass features. The signal output or sound pressure increases from about 105 dB to about 115 dB at the same peak frequency as FIG. 13A. However, the film stack having 10 piezoelectric layers has a signal output or sound pressure that is less compared to the film stack having 32 piezoelectric layers.

Figure 13D:
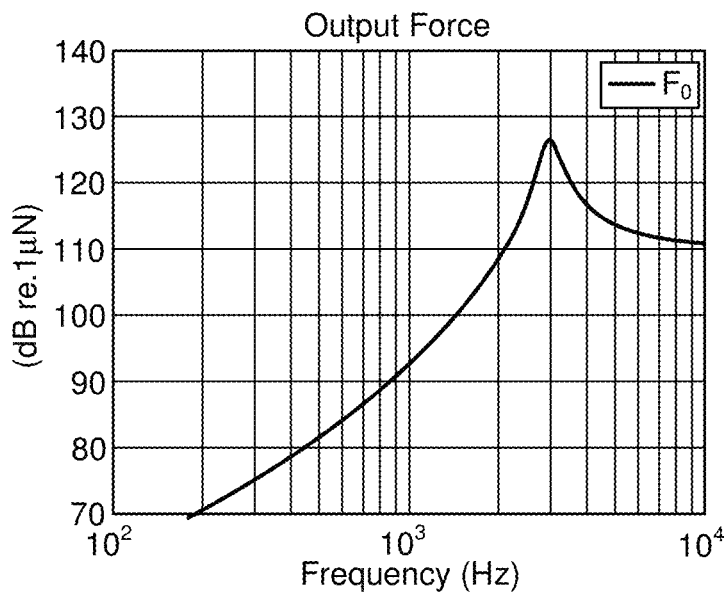
FIG. 13D shows a graph illustrating signal output as a function of frequency for a film stack having 32 piezoelectric layers each being three times longer than a standard piezoelectric layer.

FIG. 13D shows a graph illustrating signal output as a function of frequency for a film stack having 32 piezoelectric layers each being three times longer than a standard piezoelectric layer. An increased length may correspond to an increased area for a piezoelectric layer. As shown in FIG. 13D, increased area in the piezoelectric layer increases signal output or sound pressure from 120 dB to about 125 dB for a film stack having 32 piezoelectric layers.

Figure 13E:
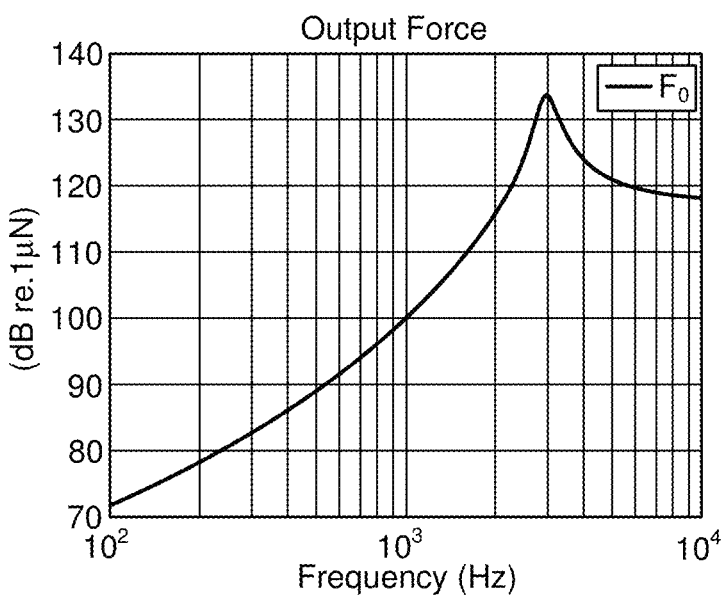
FIG. 13E shows a graph illustrating signal output as a function of frequency for a film stack having 32 piezoelectric layers each being three times longer and five times wider than a standard piezoelectric layer.

FIG. 13E shows a graph illustrating signal output as a function of frequency for a film stack having 32 piezoelectric layers each being three times longer and five times wider than a standard piezoelectric layer. An increased width may correspond to an increased thickness for a piezoelectric layer. As shown in FIG. 13E, increased thickness in the piezoelectric layer increases signal output or sound pressure from 125 dB to about 133 dB for a film stack having 32 piezoelectric layers.

Figure 14A:
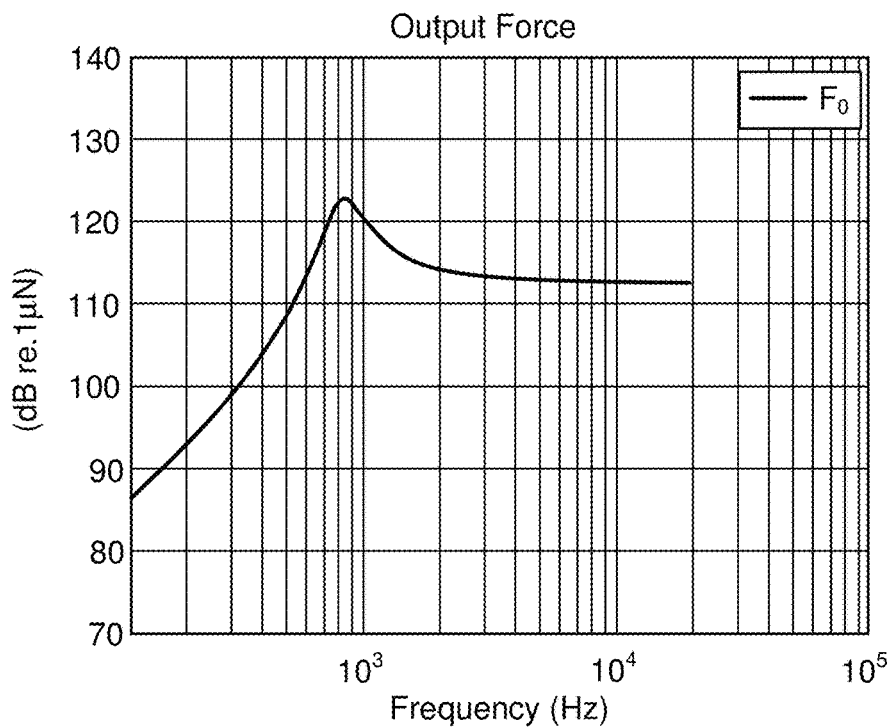
FIG. 14A shows a graph illustrating signal output as a function of frequency for a film stack having a piezoelectric layer and no spacer layer.

FIG. 14A shows a graph illustrating signal output as a function of frequency for a film stack having a piezoelectric layer and no spacer layer. The peak frequency is located at approximately 1 kHz with an amplitude of about 122 dB.

Figure 14B:
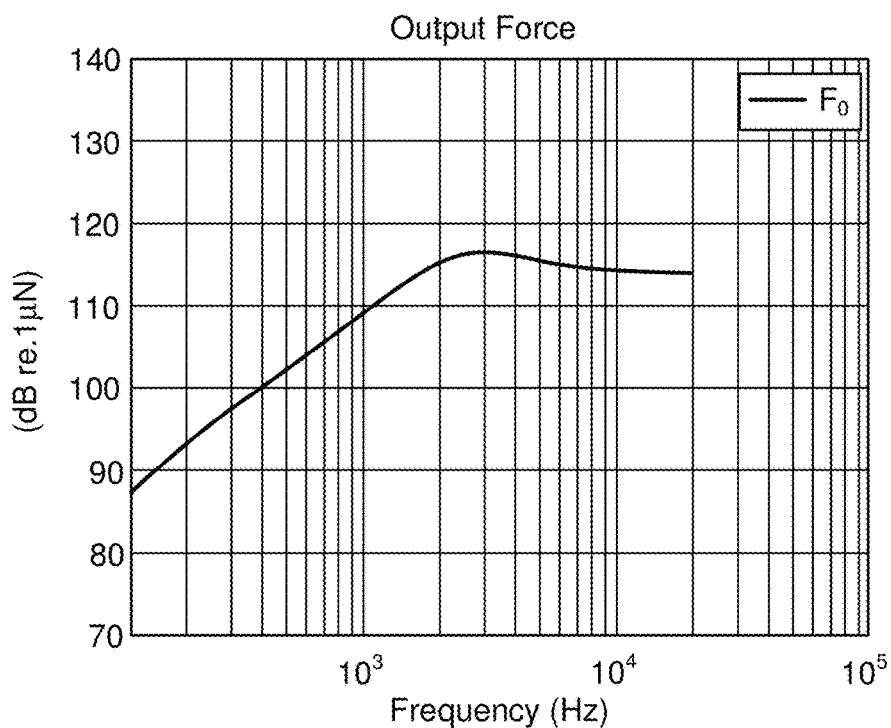
FIG. 14B shows a graph illustrating signal output as a function of frequency for a film stack having a piezoelectric layer and a spacer layer.

FIG. 14B shows a graph illustrating signal output as a function of frequency for a film stack having a piezoelectric layer and a spacer layer. Having a spacer layer may dampen or amplify the signal output in one or more frequency ranges such as the human audible range and/or shift a peak frequency of the signal output to a different frequency. This can reduce the noise that is generated by the active layer, and this can shift the peak frequency to a frequency that some individuals are not as sensitive to. As shown in FIG. 14B, the peak frequency of the signal output shifts from about 1 kHz to about 3 kHz, and the amplitude may be dampened from about 122 dB to about 116 dB. Optimizing a thickness of the spacer layer may adjust signal output in a desired frequency range. For example, if the desired frequency range is the ultrasonic range, the optimal thickness of the spacer layer may make the signal output largest at 10 MHz.

Figure 15A:
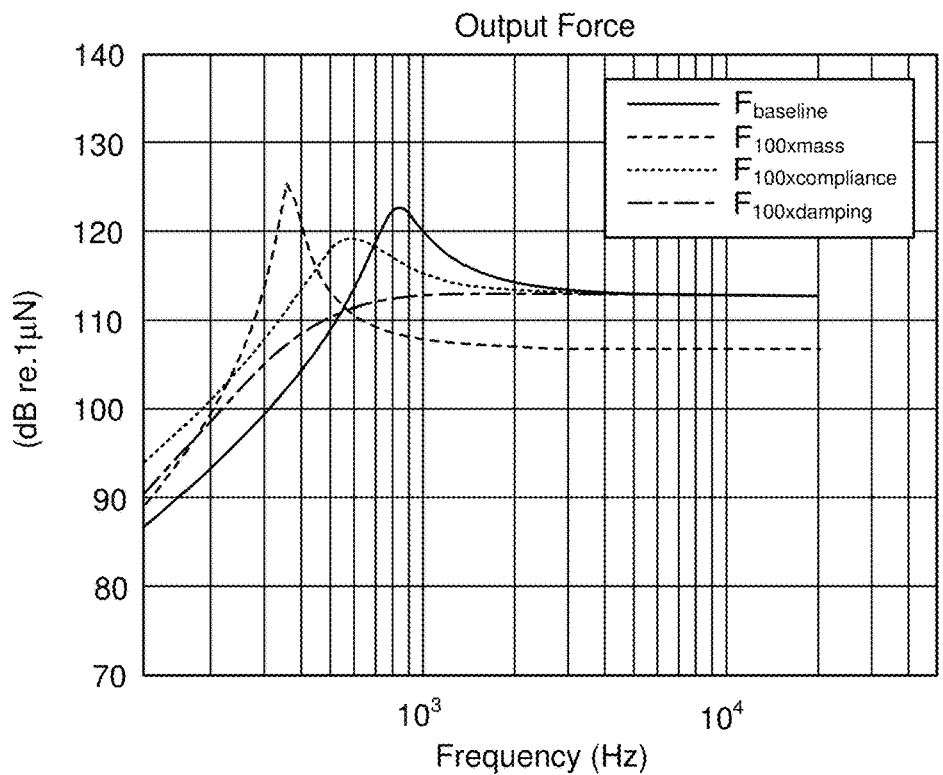
FIG. 15A shows a graph illustrating signal output as a function of frequency comparing effects of using spacer layers made of different materials.

FIG. 15A shows a graph illustrating signal output as a function of frequency comparing effects of using spacer layers made of different materials. Different materials may be defined by different properties in the spacer layer. Thus, a spacer layer may be: (1) baseline material, (2) material having 100× more mass, (3) material having 100× more compliance, or (4) material having 100× more damping. Changing material properties in the spacer layer adjusts the peak frequency of the signal output in at least the human audible range. As shown in FIG. 15A, different materials may shift the signal output behavior in a mathematical model by comparing a baseline spacer layer, a spacer layer having 100 times more mass than the baseline spacer layer, a spacer layer having 100 times more compliance than the baseline spacer layer, and a spacer layer having 100 times more damping than the baseline spacer layer.

Figure 15B:
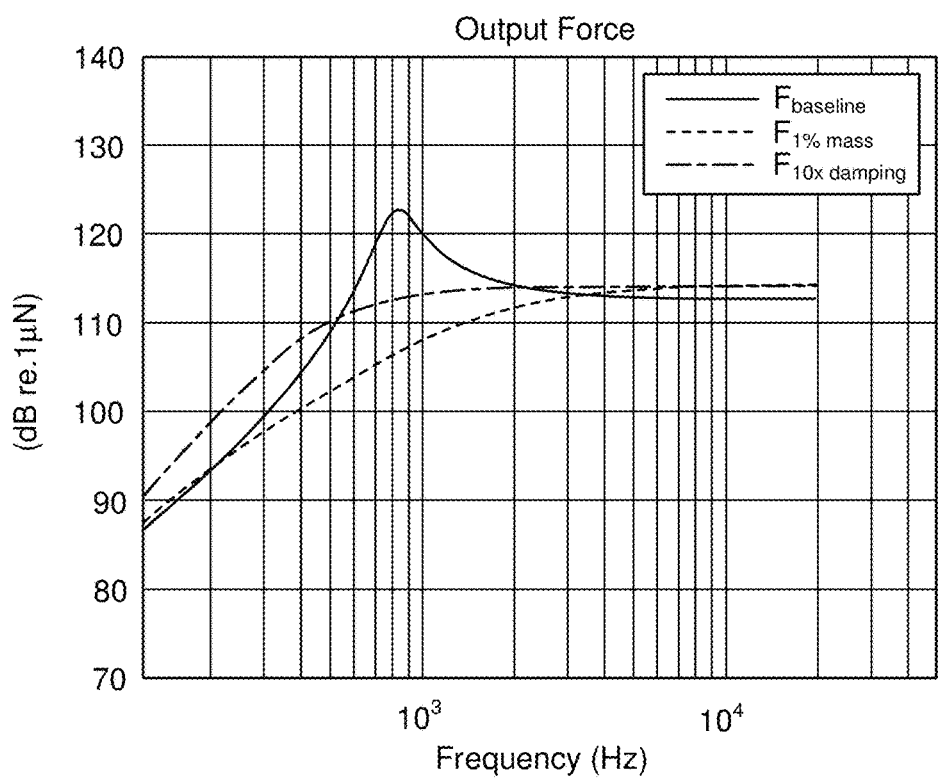
FIG. 15B shows a graph illustrating signal output as a function of frequency comparing effects of using different mass features made of different materials.

FIG. 15B shows a graph illustrating signal output as a function of frequency comparing effects of using different mass features made of different materials. The mass features may be positioned on a backside of a piezoelectric layer and only partially cover a surface of the piezoelectric layer. The mass features may adjust the signal output in one or more frequency ranges such as a frequency range between about 20 Hz and about 20 kHz and/or shift a peak frequency of the signal output to a different frequency. For example, the one or more mass features may amplify or dampen the signal output in at least the human audible range and/or shift a peak frequency of the signal output to a frequency outside the human audible range. The signal output behavior may be tuned or controlled by selecting an appropriate material, thickness, geometry, and placement of the mass features. As shown in FIG. 15B, different materials may shift the signal output behavior in a mathematical model by comparing baseline mass features, mass features having 1% mass of the baseline mass features, and mass features having ten times more damping than the baseline mass features.

Figure 16:
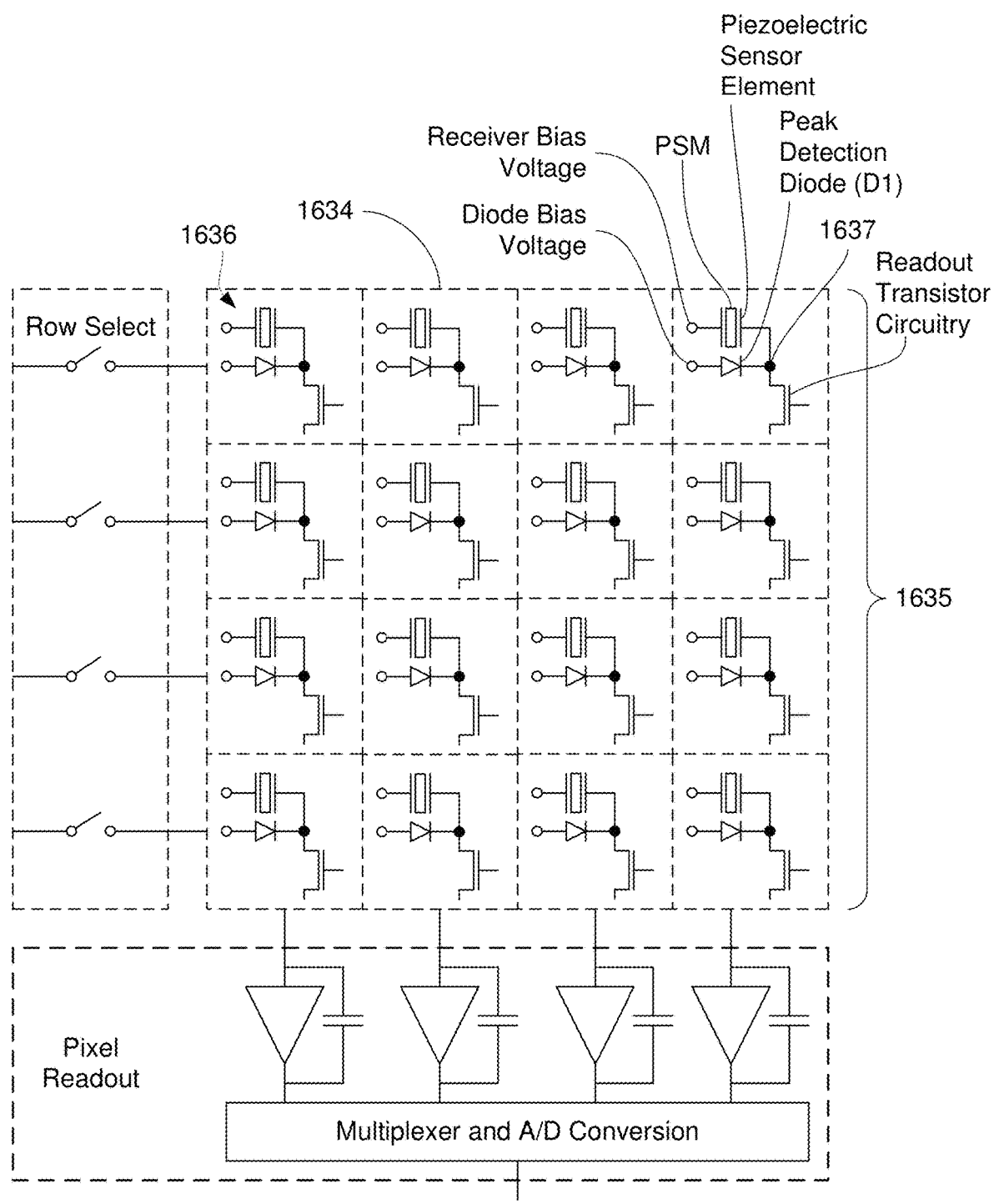
FIG. 16 shows a schematic diagram of an example 4×4 pixel array of sensor pixels for an ultrasonic fingerprint sensor system.

FIG. 16 representationally depicts aspects of a 4×4 pixel array of sensor pixels for an ultrasonic sensor system. Each pixel 1634 may be, for example, associated with a local region of piezoelectric sensor material (PSM), a peak detection diode (D1) and a readout transistor (M3); many or all of these elements may be formed on or in a substrate to form the pixel circuit 1636. In practice, the local region of piezoelectric sensor material of each pixel 1634 may transduce received ultrasonic energy into electrical charges. The peak detection diode D1 may register the maximum amount of charge detected by the local region of piezoelectric sensor material PSM. Each row of the pixel array 1635 may then be scanned, e.g., through a row select mechanism, a gate driver, or a shift register, and the readout transistor M3 for each column may be triggered to allow the magnitude of the peak charge for each pixel 1634 to be read by additional circuitry, e.g., a multiplexer and an A/D converter. The pixel circuit 1636 may include one or more TFTs to allow gating, addressing, and resetting of the pixel 1634.

Each pixel circuit 1636 may provide information about a small portion of the object detected by the ultrasonic sensor system. While, for convenience of illustration, the example shown in FIG. 16 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Figure 17A:
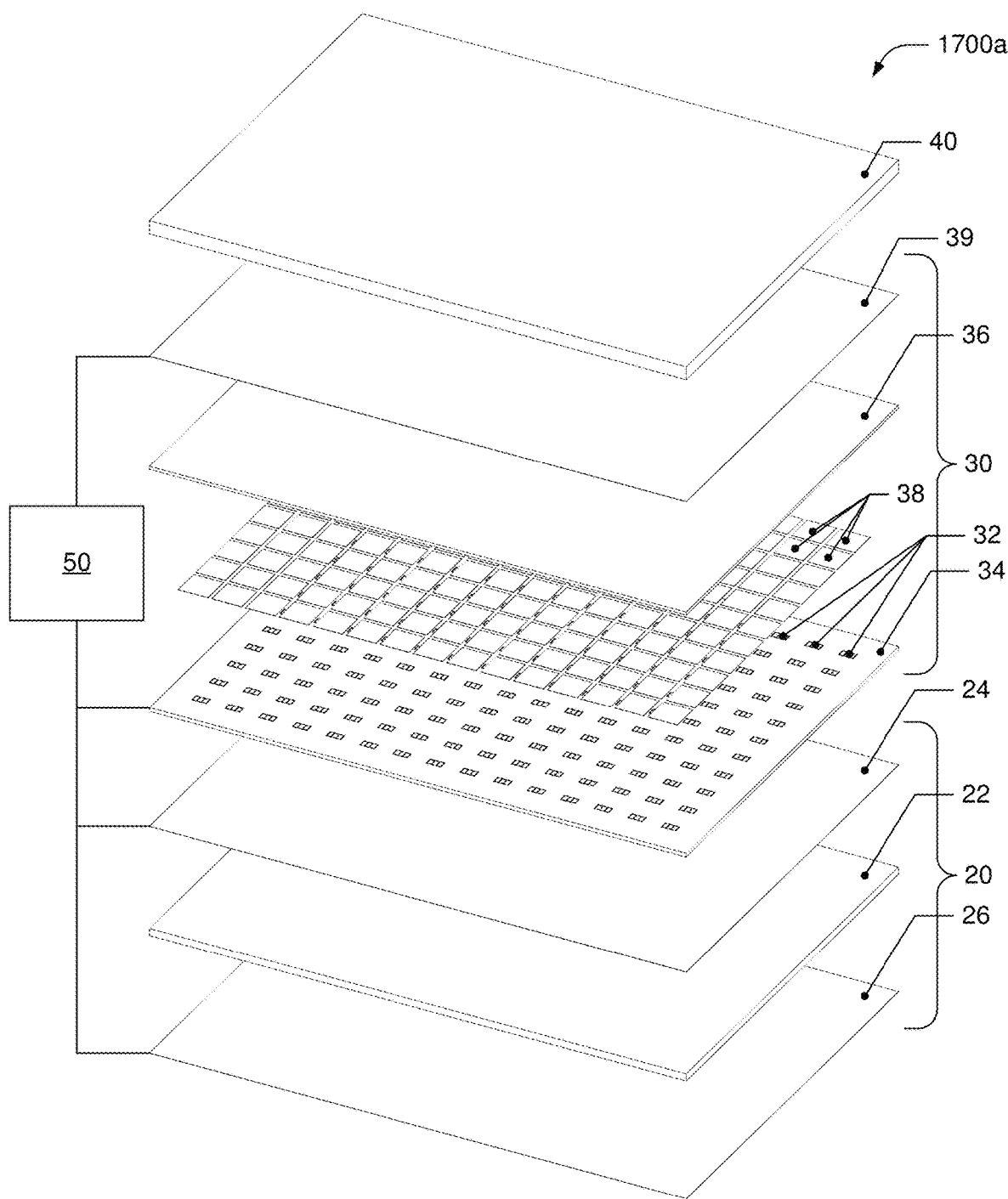
FIGS. 17A-17B show example arrangements of ultrasonic transmitters and receivers in example ultrasonic fingerprint sensor systems, with other arrangements being possible.

FIG. 17A shows an example of an exploded view of an ultrasonic sensor system. In this example, the ultrasonic sensor system 1700a includes an ultrasonic transmitter 20 and an ultrasonic receiver 30 under a platen 40. According to some implementations, the ultrasonic receiver 30 may be an example of the ultrasonic sensor system 202 that is shown in FIG. 2 and described above. In some implementations, the ultrasonic transmitter 20 may be an example of the optional ultrasonic transmitter that is shown in FIG. 2 and described above. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 50 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other object to be detected), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into localized electrical charges by the piezoelectric receiver layer 36. These localized charges may be collected by the pixel input electrodes 38 and passed on to the underlying sensor pixel circuits 32. The charges may be amplified or buffered by the sensor pixel circuits 32 and provided to the control system 50.

The control system 50 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 50 may operate substantially as described above. For example, the control system 50 may be capable of processing the amplified signals received from the sensor pixel circuits 32.

The control system 50 may be capable of controlling the ultrasonic transmitter 20 and/or the ultrasonic receiver 30 to obtain ultrasonic image data, e.g., by obtaining fingerprint images. Whether or not the ultrasonic sensor system 1700a includes an ultrasonic transmitter 20, the control system 50 may be capable of obtaining attribute information from the ultrasonic image data. In some examples, the control system 50 may be capable of controlling access to one or more devices based, at least in part, on the attribute information. The ultrasonic sensor system 1700a (or an associated device) may include a memory system that includes one or more memory devices. In some implementations, the control system 50 may include at least a portion of the memory system. The control system 50 may be capable of obtaining attribute information from ultrasonic image data and storing the attribute information in the memory system. In some implementations, the control system 50 may be capable of capturing a fingerprint image, obtaining attribute information from the fingerprint image and storing attribute information obtained from the fingerprint image (which may be referred to herein as fingerprint image information) in the memory system. According to some examples, the control system 50 may be capable of capturing a fingerprint image, obtaining attribute information from the fingerprint image and storing attribute information obtained from the fingerprint image even while maintaining the ultrasonic transmitter 20 in an "off" state.

In some implementations, the control system 50 may be capable of operating the ultrasonic sensor system 1700a in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 1700a is operating in the force-sensing mode. In some implementations, the control system 50 may be capable of controlling other devices, such as a display system, a communication system, etc. In some implementations, the control system 50 may be capable of operating the ultrasonic sensor system 1700a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 µm thick and a PVDF-TrFE receiver layer 36 is approximately 12 µm thick. Example frequencies of the ultrasonic waves may be in the range of 5 MHz to 30 MHz, with wavelengths on the order of a millimeter or less.

Figure 17B:
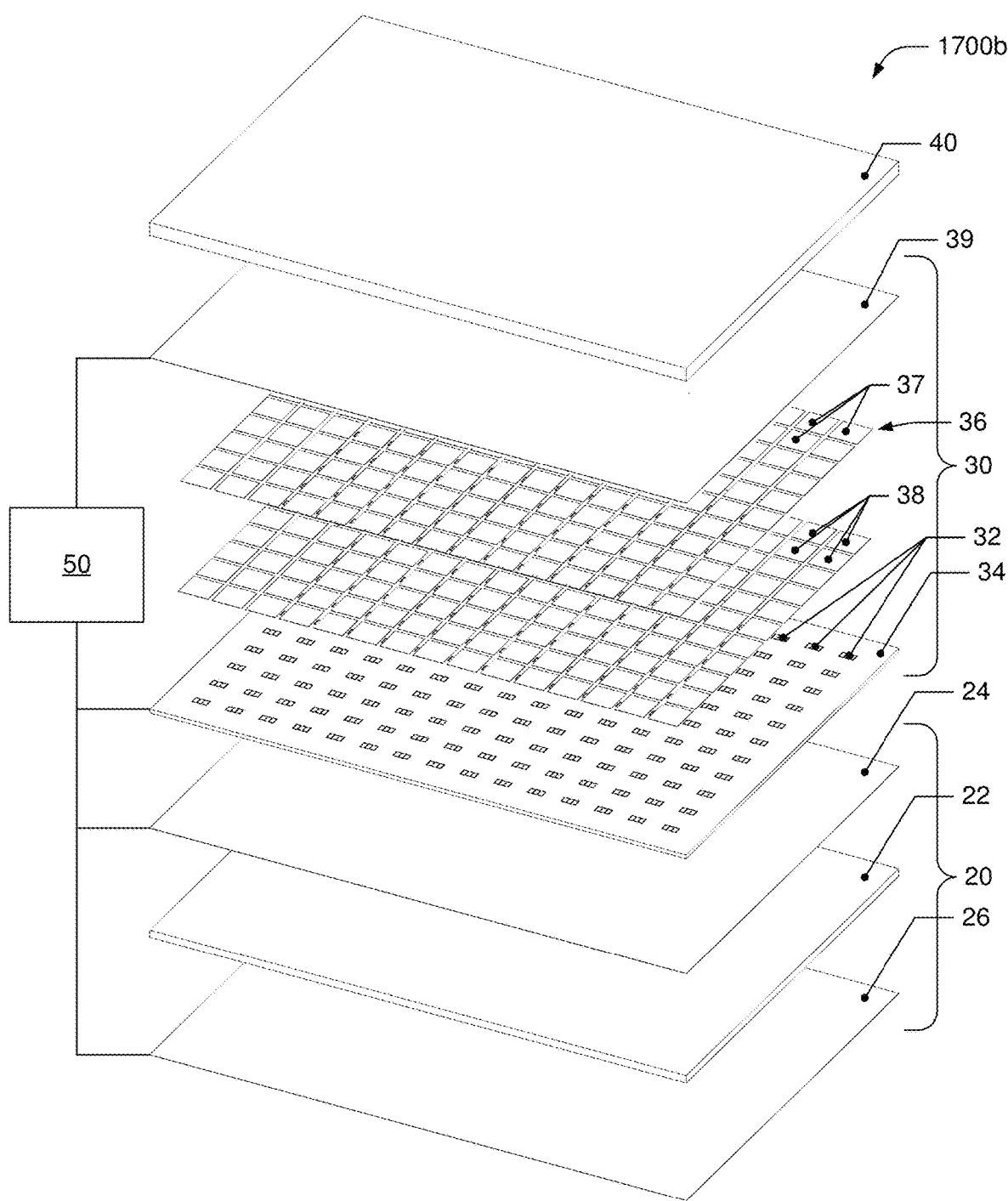

FIG. 17B shows an exploded view of an alternative example of an ultrasonic sensor system. In this example, the piezoelectric receiver layer 36 has been formed into discrete elements 37. In the implementation shown in FIG. 17B, each of the discrete elements 37 corresponds with a single pixel input electrode 38 and a single sensor pixel circuit 32. However, in alternative implementations of the ultrasonic sensor system 1300b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 17A and 17B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally in terms of functionality and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller or state machine. A processor may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, the structures disclosed in this specification and their structural equivalents thereof, or in any combination thereof. Implementations of the subject matter described in this specification may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module that may reside on a computer-readable medium. Computer-readable media include both computer storage media and communication media including any medium that may be enabled to transfer a computer program from one place to another. Storage media may be any available media that may be accessed by a computer. By way of example and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein.

Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A mobile device comprising:
    a platen;
    a display underlying the platen;
    a thin-film transistor (TFT) layer underlying the display, wherein the TFT layer comprises an array of pixel electrodes, wherein adjacent pixel electrodes are separated by voids or flexible material;
    a first piezoelectric polymer layer adjacent to and coupled to the TFT layer;
    an electrode layer adjacent to and coupled to the first piezoelectric polymer layer, wherein the first piezoelectric polymer layer is positioned between the electrode layer and the TFT layer, wherein the TFT layer, and the first piezoelectric polymer layer form an ultrasonic sensor configured to operate in a d33 stretching mode;
    a second piezoelectric polymer layer underlying the display, wherein the second piezoelectric polymer layer is configured to operate in a d31 bending mode in a second frequency range between about 20 kHz and about 1 MHz to function as a contactless proximity or gesture detector; and
    a stiff epoxy adhesive layer between the TFT layer and the display, wherein the stiff epoxy adhesive has a Young's modulus equal to or greater than about 1.0 GPa.

2. The mobile device of claim 1, wherein the d33 stretching mode is configured to operate in a first frequency range between about 1 MHz and about 100 MHz.

3. The mobile device of claim 1, wherein the second piezoelectric polymer layer is mechanically coupled to the display in a region of the display separate from a region occupied by the ultrasonic sensor.

4. The mobile device of claim 1, wherein the second piezoelectric polymer layer is mechanically coupled to and underlying the ultrasonic sensor.

5. The mobile device of claim 1, further comprising:
    a spacer layer between the second piezoelectric polymer layer and the display, wherein the spacer layer includes a plastic, metal or glass material.

6. The mobile device of claim 5, wherein the second piezoelectric polymer layer is configured to generate acoustic waves, wherein the spacer layer is configured to adjust a signal output of the acoustic waves generated by the second piezoelectric polymer layer in one or more frequency ranges and/or shift a peak frequency of the acoustic waves generated by the second piezoelectric polymer layer.

7. The mobile device of claim 5, wherein a thickness of the spacer layer is at least two times greater than a thickness of the second piezoelectric polymer layer.

8. The mobile device of claim 1, wherein a thickness of the TFT layer is at least two times less than a thickness of the platen.

9. The mobile device of claim 1, further comprising:
    one or more mass features attached to the second piezoelectric polymer layer, wherein the one or more mass features include a plastic, metal, or glass material.

10. The mobile device of claim 1, wherein a major surface of the second piezoelectric polymer layer spans more than about 50% of the display.

11. The mobile device of claim 1, further comprising:
    a plurality of piezoelectric polymer layers underlying the second piezoelectric polymer layer.

12. The mobile device of claim 1, wherein the each of first and second piezoelectric polymer layers comprises polyvinylidene fluoride (PVDF) or polyvinylidene fluoride-trifluoroethylene (PVDF-TrFE) copolymer, wherein the platen comprises a cover glass, wherein a thickness of the TFT layer is equal to or less than about 250 μm.

13. A mobile device comprising:
    a platen;
    a display underlying the platen;
    a thin-film transistor (TFT) layer underlying the display, wherein the TFT layer comprises an array of pixel electrodes, wherein each of the pixel electrodes has one or more voids or one or more filled voids with flexible material;
    a first piezoelectric polymer layer adjacent to and coupled to the TFT layer;
    an electrode layer adjacent to and coupled to the first piezoelectric polymer layer, wherein the first piezoelectric polymer layer is positioned between the electrode layer and the TFT layer, wherein the TFT layer, and the first piezoelectric polymer layer form an ultrasonic sensor configured to operate in a d33 stretching mode;
    a second piezoelectric polymer layer underlying the display, wherein the second piezoelectric polymer layer is configured to operate in a d31 bending mode in a second frequency range between about 20 kHz and about 1 MHz to function as a contactless proximity or gesture detector; and
    a stiff epoxy adhesive layer between the TFT layer and the display, wherein the stiff epoxy adhesive has a Young's modulus equal to or greater than about 1.0 GPa.

* * * * *